United States Patent
van Lengerich et al.

(10) Patent No.: US 12,097,498 B2
(45) Date of Patent: *Sep. 24, 2024

(54) NANOPATTERNED FILMS WITH PATTERNED SURFACE CHEMISTRY

(71) Applicant: 3M INNOVATIVE PROPERTIES COMPANY, St. Paul, MN (US)

(72) Inventors: Henrik B. van Lengerich, St. Paul, MN (US); Caleb T. Nelson, McKinney, TX (US); Kayla C. Niccum, Maplewood, MN (US); Jeffrey L. Solomon, Centerville, MN (US); Paul B. Armstrong, St. Paul, MN (US); Joshua M. Fishman, St. Louis Park, MN (US); Tonya D. Bonilla, Woodbury, MN (US); Phillip D. Hustad, St. Paul, MN (US); David J. Tarnowski, Mahtomedi, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/259,177

(22) PCT Filed: Nov. 24, 2021

(86) PCT No.: PCT/IB2021/060930
§ 371 (c)(1),
(2) Date: Jun. 23, 2023

(87) PCT Pub. No.: WO2022/144626
PCT Pub. Date: Jul. 7, 2022

(65) Prior Publication Data
US 2024/0050951 A1 Feb. 15, 2024

Related U.S. Application Data

(60) Provisional application No. 63/132,834, filed on Dec. 31, 2020.

(51) Int. Cl.
*B01L 3/00* (2006.01)
*B29D 11/00* (2006.01)
*G01N 21/64* (2006.01)

(52) U.S. Cl.
CPC ... *B01L 3/502761* (2013.01); *B01L 3/502707* (2013.01); *B29D 11/00788* (2013.01); *G01N 21/6428* (2013.01); *B01L 2200/0647* (2013.01); *B01L 2300/0636* (2013.01); *B01L 2300/0819* (2013.01); *B01L 2300/0893* (2013.01); *B01L 2300/16* (2013.01); *G01N 2021/6439* (2013.01)

(58) Field of Classification Search
CPC ......... B01L 3/502761; B01L 3/502707; B01L 2200/0647; B01L 2300/0636; B01L 2300/0819; B01L 2300/0893; B01L 2300/16; B01L 3/502746; B01L 2300/0896; B29D 11/00788; G01N 21/6428; G01N 2021/6439; B82Y 30/00
See application file for complete search history.

(56) References Cited

U.S. PATENT DOCUMENTS

| | | | |
|---|---|---|---|
| 5,175,030 A | 12/1992 | Lu et al. | |
| 5,183,597 A | 2/1993 | Lu | |
| 6,696,157 B1 | 2/2004 | David et al. | |
| 7,173,778 B2 | 2/2007 | Jing et al. | |
| 7,794,799 B1 | 9/2010 | Kim et al. | |
| 8,227,260 B2 | 7/2012 | Yguerabide et al. | |
| 8,460,568 B2 | 6/2013 | David et al. | |
| 8,628,729 B2 | 1/2014 | Carrilho et al. | |
| 8,634,146 B2 | 1/2014 | David et al. | |
| 8,664,323 B2 | 3/2014 | Iyer et al. | |
| 9,012,022 B2 | 4/2015 | George et al. | |
| 9,512,422 B2 | 12/2016 | Barnard et al. | |
| 9,597,684 B2 | 3/2017 | Vella et al. | |
| 9,669,638 B2 | 6/2017 | Ferrara, Jr. et al. | |

(Continued)

FOREIGN PATENT DOCUMENTS

| WO | 2016176129 A1 | 11/2016 |
|---|---|---|
| WO | 2017015018 A1 | 1/2017 |

(Continued)

OTHER PUBLICATIONS

Aguirre-Soto, "Excitation of Metastable Intermediates in Organic Photoredox Catalysis: Z-Scheme Approach Decreases Catalyst Inactivation", ACS Catalysis, 2018, vol. 08, pp. 6394-6400.

Aguirre-Soto, "On the role of N-vinylpyrrolidone in the aqueous radical-initiated copolymerization with PEGDA mediated by eosin Y in the presence of O2", Polymer Chemistry, 2019, vol. 10, No. 08, pp. 926-937.

(Continued)

*Primary Examiner* — Narayan K Bhat
(74) *Attorney, Agent, or Firm* — Thomas M. Spielbauer

(57) ABSTRACT

An article includes a flexible structured film with a first major surface and a second major surface, wherein a first major surface of the flexible structured film has a plurality of posts separated by land areas, and the posts have an exposed surface. An anti-biofouling layer resides in the land areas, and the anti-biofouling layer has a methylated surface. An inorganic layer is on the exposed surfaces of the posts, wherein the inorganic layer includes a metal or a metal oxide. An analyte binding layer is on the inorganic layer, wherein the analyte binding layer is chosen from a reactive silane, a functionalizable hydrogel, a functionalizable polymer, and mixtures and combinations thereof. An exposed surface of the analyte binding layer includes at least one functional group selected to bind with a biochemical analyte.

20 Claims, 14 Drawing Sheets

(56) References Cited

U.S. PATENT DOCUMENTS

| | | | |
|---|---|---|---|
| 9,790,396 | B2 | 10/2017 | Klun et al. |
| 9,908,772 | B2 | 3/2018 | David et al. |
| 10,134,566 | B2 | 11/2018 | David et al. |
| 10,370,705 | B2 | 8/2019 | Ismagilov et al. |
| 10,682,829 | B2 | 6/2020 | Bowen et al. |
| 2009/0221096 | A1 | 9/2009 | Torres |
| 2013/0229378 | A1 | 9/2013 | Iyer et al. |
| 2017/0182493 | A1 | 6/2017 | Perroud et al. |
| 2018/0207920 | A1 | 7/2018 | Venkatesan et al. |
| 2019/0127796 | A1 | 5/2019 | Huang et al. |
| 2019/0232890 | A1 | 8/2019 | Nydam et al. |
| 2019/0360041 | A1 | 11/2019 | Wu et al. |
| 2020/0024661 | A1 | 1/2020 | Merkel et al. |
| 2020/0048511 | A1 | 2/2020 | Zhang et al. |
| 2020/0048698 | A1 | 2/2020 | Cai et al. |
| 2020/0095476 | A1 | 3/2020 | Sahni et al. |
| 2024/0011975 | A1* | 1/2024 | Fishman .............. G01N 33/552 |

FOREIGN PATENT DOCUMENTS

| | | | |
|---|---|---|---|
| WO | 2017201198 | A1 | 11/2017 |
| WO | 2018005311 | A1 | 1/2018 |
| WO | 2018152062 | A1 | 8/2018 |
| WO | 2018178781 | A2 | 10/2018 |
| WO | 2018178850 | A1 | 10/2018 |
| WO | 2019205834 | A1 | 10/2019 |
| WO | 2020003207 | A1 | 1/2020 |
| WO | 2020095258 | A1 | 5/2020 |
| WO | 2020234774 | A1 | 11/2020 |
| WO | 2022058845 | A1 | 3/2022 |
| WO | 2022200867 | A1 | 9/2022 |
| WO | 2022200868 | A1 | 9/2022 |
| WO | 2022208321 | A1 | 10/2022 |

OTHER PUBLICATIONS

Badu-Tawiah, "Polymerization-Based Signal Amplification for Paper-Based Immunoassays", Lab Chip, 2015, vol. 15, pp. 655-659.

Dellal, "Low-Cost Plug and Play Photochemistry Reactor" HardwareX, 2018, vol. 03, pp. 01-09.

Fernandes, "Fabrication of Three-dimensional Paper-based Microfluidic Devices for Immunoassays", Journal of Visualized Experiments, Mar. 2017, vol. 121, pp. e55287/1-e55287/10.

International Search Report for PCT International Application No. PCT/IB2021/060930, mailed on Feb. 2, 2022, 3 pages.

Kaastrup, "Impact of Dissociation Constant on Detection Sensitivity of Polymerization-Based Signal Amplification Reactions", Analytical Chemistry, 2013, vol. 85, pp. 8055-8060.

Kaastrup, "Investigation of Dendrimers Functionalized with Eosin as Macrophotoinitiators for Polymerization-Based Signal Amplification Reactions", RSC Advances, 2015, vol. 05, pp. 15652-15659.

Kaastrup, "Polymerization-Based Signal Amplification Under Ambient Conditions With Thirty-Five Second Reaction Times", Lab On A Chip, 2012, vol. 12, pp. 4055-4058.

Kaastrup, "Using Photo-Initiated Polymerization Reactions to Detect Molecular Recognition", Chemical Society Review, 2016, vol. 45, pp. 532-545.

Kaastrup, "UV-Vis/FT-NIR In Situ Monitoring of Visible-Light Induced Polymerization of PEGDA Hydrogels Initiated by Eosin/Triethanolamine/O2", Polymer Chemistry, 2016, vol. 07, pp. 592-602.

Lathwal, "A Method for Designing Instrument-Free Quantitative Immunoassays", Analytical Chemistry, 2016, vol. 88, pp. 3194-3202.

Lathwal, "Assessment of Colorimetric Amplification Methods In A Paper-Based Immunoassay for Diagnosis of Malaria", Lab Chip, 2016, vol. 16, pp. 1374-1382.

Lee, "Balancing The Initiation And Molecular Recognition Capabilities of Eosin Macroinitiators of Polymerization-Based Signal Amplification Reactions", Macromolecular Rapid Communications, 2014, vol. 35, pp. 981-986.

Lee, "Systematic Study of Fluorescein-Functionalized Macrophotoinitiators for Colorimetric Bioassays", Biomacromolecules, 2012, vol. 13, No. 04, pp. 1136-1143.

Miller, "Addressing Barriers to the Development and Adoption of Rapid Diagnostic Tests in Global Health", Nanobiomedicine, 2015, vol. 02, No. 06, pp. 1-21.

Miller, "Paper-Based Diagnostics in the Antigen-Depletion Regime: High-Density Immobilization of rcSso7d-Cellulose-Binding Domain Fusion Proteins for Efficient Target Capture", Biosensors and Bioelectronics, Apr. 2018, vol. 102, pp. 456-463.

Miller, "Activity-Based Assessment of An Engineered Hyperthermophilic Protein as A Capture Agent In Paper-Based Diagnostic Tests," Molecular Systems Design & Engineering, Dec. 2016, vol. 01, No. 04, pp. 377-381.

Reboud, "Paper-Based Microfluidics for DNA Diagnostics of Malaria in Low Resource Underserved Rural Communities", PNAS, 2019, vol. 116, No. 11, pp. 4834-4842.

Reece, "Staged Inertial Microfluidic Focusing for Complex Fluid Enrichment", RSC Advances, 2015, vol. 05, pp. 53857-53864.

Shatova, "Portable, Constriction-Expansion Blood Plasma Separation and Polymerization-Based Malaria Detection", Analytical Chemistry, 2016, vol. 88, pp. 7627-7632.

Sung, "Engineering Hyperthermostable rcSso7d as Reporter Molecule for in vitro Diagnostic Tests," Molecular Systems Design & Engineering, 2018, vol. 03, pp. 877-882.

Wang, "Photocurable Amphiphilic Perfluoropolyether/Poly(ethylene glycol) Networks for Fouling-Release Coatings"; Macromolecules, 2011, vol. 44, No. 04, pp. 878-885.

Wong, "A Quantitative Analysis of Peroxy-Mediated Cyclic Regeneration of Eosin Under Oxygen-Rich Photopolymerization Conditions", Polymer, 2015, vol. 69, pp. 169-177.

Wong, "The Impact Of Continuous Oxygen Flux In A Thin Film Photopolymerization Reaction With Peroxy-Mediated Regeneration Of Initiator", Macromolecular theory and simulations, May 2016, vol. 25, No. 3, pp. 229-237.

Xu, "Paper-Origami-Based Multiplexed Malaria Diagnostics from Whole Blood", Angewandte Chemie International Edition, 2016, vol. 55, pp. 15250-15253.

Yee, "Detection of Biomarkers of Periodontal Disease in Human Saliva Using Stabilized, Vertical Flow Immunoassays", ACS Sensors, 2017, vol. 02, pp. 1589-1593.

Yetisen, "Paper-Based Microfluidic Point-of-Care Diagnostic Devices", Lab Chip, 2013, vol. 13, pp. 2210-2251.

\* cited by examiner

NANOPATTERNED FILMS WITH PATTERNED SURFACE CHEMISTRY

CROSS REFERENCE TO RELATED APPLICATIONS

This application is a national stage filing under 35 U.S.C. 371 of PCT/IB2021/060930, filed 24 Nov. 2021, which claims the benefit of U.S. Application No. 63/132,834, filed 31 Dec. 2020, the disclosure of which is incorporated by reference in its/their entirety herein.

BACKGROUND

High-throughput chemical and biological assays such as nucleic acid and peptide sequencing, or protein, gene and other biochemical and pharmaceutical assays, rely on costly single-use consumables. For example, in addition to chemical and biological reagents used to probe, detect or measure the unknown sample, the high-throughput assays often require the use of a patterned flow cell consumable in which the chemical and biochemical reagents can selectively react with a target analyte.

Today, patterned flow cells in commercially available assays include glass or silicon substrates with etched nanowells. The nanowells in the glass substrates each include chemical functionality selected to bind a chosen target analyte and are separated by regions of an antifouling or non-interacting coatings or surface chemistry. In some examples, the chemical functionality can be a functionalized polymer or oligomer, for example a polyacrylamide containing hydrogel, or directly attached to the substrate via a small molecule linker. These patterned flow cells can be manufactured using an intricate and expensive wafer-based photolithographic process that includes multiple chemical-mechanical planarization (CMP), spin coating and washing steps to fill the nanowells with the correct chemical functionality, and place the anti-biofouling coating between the nanowells.

To reduce the financial burden for end users using high-throughput assays, and make the assays more accessible for new markets, it is necessary to reduce the costs of the consumables used, including the glass or silicon substrates with etched nanowells.

SUMMARY

In general, the present disclosure is directed to nanopatterned substrates for use in chemical or biological assays such as, for example, nucleic acid, protein, and other biochemical screening procedures, which are formed on a flexible structured film. In various embodiments, the flexible structured film can be structured with nanoscale posts having functionalized analyte-binding regions selected to bind with a target analyte in an assay. In some embodiments, the functionalized posts can be interspersed among anti-biofouling land areas.

Some anti-biofouling layers used in chemical or biological assays can be made from materials such as amorphous fluoropolymer resins that require baking at high temperatures (greater than about 50° C.) for several 30 minute cycles. In contrast, the anti-biofouling layers of the present disclosure are made from materials including a non-reactive hydrophobic methylated surface, which can eliminate the need for high temperature baking cycles in the production process.

The nanopatterned flexible polymeric film substrates can be produced in a continuous manufacturing process, which can provide higher throughput and lower manufacturing costs compared to wafer-based photolithographic process methods that are generated on a parts basis. The nanopatterned flexible polymeric film substrates can be configured for use with a wide variety of assay reagents and instrumentation, and can be used in, for example, whole genome sequencing, microbiome sequencing, detection of genes or gene segments, detection of RNA, single-nucleotide polymorphism detection, mRNA sequencing, non-coding RNA sequencing, DNA methylation sequencing, protein expression, protein sequencing, detection of peptides and other biochemical compounds, detection of small molecules or biomarkers, as well as for detection of chemical and environmental contaminants. In some embodiments, the flexible organic carrier film substrate can be adhesively mounted on a support layer, which can make it possible to use the substrate in screening instruments that currently employ more rigid silicon or glass substrate materials.

Continuous processing, which in some cases is also referred to as roll-to-roll processing, also provides several advantages and increased design flexibility relative to silicon wafer processing techniques when producing a nanostructured substrate. For example, when nanopatterned substrates are made using a silicon wafer, grafting analyte binding chemistry on post-like structures extending away from the surface of the wafer can be difficult, and as a result in silicon wafer constructions the binding chemistry can be limited to the depressed well-like areas of the wafer. In addition, because thick inorganic layers take longer to deposit, and due to necessary flexibility of the polymer carrier web, the inorganic layer can be made thin (less than 200 nm). Further, in contrast to traditional wafer processing, amorphous silicon oxide layers deposited by roll-to-roll processing may include impurities such as aluminum or carbon to allow efficient deposition rates on flexible, temperature sensitive surfaces using processing techniques such as sputtering, or plasma enhanced chemical vapor deposition (PECVD).

In one aspect, the present disclosure is directed to an article, including: a flexible structured film with a first major surface and a second major surface, wherein a first major surface of the flexible structured film includes a plurality of posts separated by land areas, and wherein the posts include an exposed surface; an anti-biofouling layer in the land areas, wherein the anti-biofouling layer has a methylated surface; an inorganic layer on the exposed surfaces of the posts, wherein the inorganic layer comprises a metal, metalloid, metal oxide or a metalloid oxide; and an analyte binding layer on the inorganic layer, wherein the analyte binding layer is chosen from a reactive silane, a functionalizable hydrogel, a functionalizable polymer, and mixtures and combinations thereof, and wherein an exposed surface of the analyte binding layer comprises at least one functional group selected to bind with a biochemical analyte.

In another aspect, the present disclosure is directed to a method for making a component of a diagnostic device, the method including: providing a flexible structured film with a first major surface and a second major surface, wherein the first major surface of the flexible structured film includes a patterned surface, the patterned surface including an arrangement of posts interspersed with land areas; applying a release layer on the first major surface of the flexible structured film such that the release layer overlies the top surfaces of the posts and the land areas, wherein the release layer includes a surface rich in methyl ($CH_3$) groups; applying a planarizing layer on the release layer; etching a portion of the planarizing layer with an oxygen-containing etch material to form a non-methylated inorganic layer on the top surfaces of the posts, wherein the inorganic layer includes a metal, metalloid, metal oxide or a metalloid oxide; removing the planarizing layer; and attaching a functional silane material on the inorganic layers on the top surfaces of the posts, and polymerizing the functional silane material to form an analyte binding layer thereon, wherein the analyte binding layer is chosen from a reactive silane, a functionalizable hydrogel, a functionalizable polymer, and mixtures and combinations thereof, and wherein the analyte binding layer includes at least one functional group reactive with a biochemical analyte.

In another aspect, the present disclosure is directed to a diagnostic device for detection of a biochemical analyte, the diagnostic device including a flow cell with a patterned arrangement of fluidic channels configured to provide flow conduits for a sample fluid comprising the biochemical analyte, wherein at least some of the fluidic channels of the flow cell are lined on a surface thereof with: a flexible structured film with a first major surface and a second major surface, wherein a first major surface of the flexible structured film includes a plurality of posts with an exposed surface extending into the fluidic channels of the flow cell, wherein the posts are interspersed with land areas; an anti-biofouling layer in the land areas, wherein the anti-biofouling layer includes a methylated surface; a non-methylated inorganic layer on the exposed surfaces of the posts, wherein the inorganic layer includes a metal, metalloid, metal oxide, or a metalloid oxide; and an analyte binding layer on the inorganic layer, wherein the analyte binding layer is chosen from a reactive silane, a functionalizable hydrogel, a functionalizable polymer, and mixtures and combinations thereof, and wherein an exposed surface of the analyte binding layer includes at least one functional group selected to bind with the biochemical analyte in the sample fluid.

These and other embodiments are encompassed in the following Listing of Exemplary Embodiments.

LISTING OF EXEMPLARY EMBODIMENTS

Embodiment A. An article, comprising: a flexible structured film with a first major surface and a second major surface, wherein a first major surface of the flexible structured film comprises a plurality of posts separated by land areas, and wherein the posts comprise an exposed surface; an anti-biofouling layer in the land areas, wherein the anti-biofouling layer has a methylated surface; an inorganic layer on the exposed surfaces of the posts, wherein the inorganic layer comprises a metal or a metal oxide; and an analyte binding layer on the inorganic layer, wherein the analyte binding layer is chosen from a reactive silane, a functionalizable hydrogel, a functionalizable polymer, and mixtures and combinations thereof, and wherein an exposed surface of the analyte binding layer comprises at least one functional group selected to bind with a biochemical analyte.

Embodiment B. The article of Embodiment A, wherein the inorganic layer comprises at least one of Si, Ti, or Al, or oxides thereof, and wherein the inorganic layer has a thickness of less than about 200 nm.

Embodiment C. The article of Embodiment A, wherein the inorganic layer has a thickness of less than 50 nm.

Embodiment D. The article of any of Embodiments A to C, wherein the oxide for the inorganic layer is chosen from $SiO_2$, $SiC_xO_y$, $SiAl_xO_y$, $TiO$, $AlO_x$ and mixtures and combinations thereof.

Embodiment E. The article of Embodiment D, wherein the oxide is $SiC_xO_y$.

Embodiment F. The article of any of Embodiments A to E, wherein the inorganic layer comprises $SiC_xO_y$ and the anti-biofouling layer comprises methyl terminated $SiC_xH_y$.

Embodiment G. The article of any of Embodiments A to F, wherein the analyte binding layer comprises acrylamide copolymers, condensed silanes, and mixtures and combinations thereof.

Embodiment H. The article of any of Embodiments A to G, wherein the posts have a diameter of 100 nm to 1500 nm.

Embodiment I. The article of any of Embodiments A to H, wherein the posts have a height of greater than 0 nm and up to 1000 nm.

Embodiment J. The article of any of Embodiments A to I, wherein the flexible structured film is a low autofluorescent polymer.

Embodiment K. The article of any of Embodiments A to J, wherein the flexible structured film is a (meth)acrylic resin.

Embodiment L. The article of any of Embodiments A to K, further comprising a polymeric support layer with a first major surface and a second major surface, wherein the first major surface of the polymeric support layer is on the second major surface of the structured film.

Embodiment M. The article of Embodiment L, wherein the polymeric support layer comprises a polymer chosen from cyclic olefin copolymer (COP), polypropylene, hydrogenated styrenics, poly(meth)acrylates, polycarbonates, and mixtures and combinations thereof.

Embodiment N. The article of Embodiment L, further comprising an adhesive layer on the second major surface of the polymeric support layer.

Embodiment O. The article of claim Embodiment N, wherein the adhesive layer is optically clear.

Embodiment P. The article of Embodiment N, further comprising a support layer on the adhesive layer, wherein the support layer is chosen from a release liner and a rigid substrate.

Embodiment Q. A method for making a component of a diagnostic device, the method comprising providing a flexible structured film with a first major surface and a second major surface, wherein the first major surface of the flexible structured film comprises a patterned surface, the patterned surface comprising an arrangement of posts interspersed with land areas; applying a release layer on the first major surface of the flexible structured film such that the release layer overlies the top surfaces of the posts and the land areas, wherein the release layer comprises a surface rich in methyl ($CH_3$) groups; applying a planarizing layer on the release layer; etching a portion of the planarizing layer with an oxygen-containing etch material to form a non-methylated inorganic layer on the top surfaces of the posts, wherein the inorganic layer comprises a metal or a metal oxide; removing the planarizing layer; and attaching a functional silane material on the inorganic layers on the top surfaces of the posts, and polymerizing the functional silane material to form an analyte binding layer thereon, wherein the analyte binding layer is chosen from a reactive silane, a functionalizable hydrogel, a functionalizable polymer, and mixtures and combinations thereof, and wherein the analyte binding layer comprises at least one functional group reactive with a biochemical analyte.

Embodiment R. The method of Embodiment Q, where the planarizing layer is removed before attaching the functional silane.

Embodiment S. The method of Embodiment Q, where the functional layer is attached before the planarizing layer is removed.

Embodiment T. The method of any of Embodiments Q to S, wherein the analyte binding layer is attached to the inorganic layer by reacting the inorganic layer with one of an aminosilane or an acrylamide silane to form an acrylamide.

Embodiment U. The method of Embodiment T, wherein the acrylamide is polymerized to form a poly(acrylamide).

Embodiment V. The method of any of Embodiments Q to U, wherein the inorganic layer comprises at least one of Si, Ti, or Al, or oxides thereof, and wherein the inorganic layer has a thickness of less than about 200 nm.

Embodiment W. The method of any of Embodiments Q to V, wherein the oxide for the inorganic layer is chosen from $SiO_2$, $SiC_xO_y$, $SiAl_xO_y$, TiO, $AlO_x$ and mixtures and combinations thereof.

Embodiment X. The method of Embodiment W, wherein the oxide is $SiC_xO_y$.

Embodiment Y. The method of any of Embodiments Q to X, wherein the inorganic layer comprises $SiC_xO_y$ and the release layer comprises methyl terminated $SiC_xH_y$.

Embodiment Z. The method of any of Embodiments Q to Y, wherein the analyte binding layer comprises acrylamide copolymers, condensed silanes, and mixtures and combinations thereof.

Embodiment AA. The method of any of Embodiments Q to Z, wherein the posts have a diameter of 100 nm to 1500 nm.

Embodiment BB. The method of any of Embodiments Q to AA, wherein the posts have a height of greater than 0 nm and up to 1000 nm.

Embodiment CC. The article of any of Embodiments Q to BB, wherein the flexible structured film is a (meth)acrylic resin.

Embodiment DD. The method of any of Embodiments Q to CC, wherein the polymeric support layer comprises a cyclic olefin copolymer (COP).

Embodiment EE. The method of any of Embodiments Q to DD, further comprising roughening the first major surface of the polymeric support layer prior to adhering the flexible structured film.

Embodiment FF. The method of any of Embodiments Q to EE, wherein the planarizing layer is a resin chosen from PVB, PVA, (meth)acrylates, and mixtures and combinations thereof.

Embodiment GG. The method of any of Embodiments Q to FF, wherein the planarizing layer is removed by attaching an adhesive layer thereto to form a laminate construction, and then peeling away the laminate construction.

Embodiment HH. The method of any of Embodiments Q to GG, wherein the planarizing layer is removed by coating a layer of UV-curable (meth)acrylate thereon, laminating the layer of UV-curable (meth)acrylate to a carrier film, curing the UV-curable (meth)acrylate to form a cured construction, and peeling away the cured construction.

Embodiment II. The method of any of Embodiments Q to HH, wherein the planarizing layer is removed by applying a solvent to the planarizing layer.

Embodiment JJ. The method of any of Embodiments Q to II, further comprising applying an adhesive layer on the second major surface of the polymeric support layer.

Embodiment KK. The method of Embodiment JJ, wherein the adhesive layer is optically clear.

Embodiment LL. The method of any of Embodiments JJ to KK, further comprising applying a support layer on the adhesive layer, wherein the support layer is chosen from a release liner and a rigid substrate.

Embodiment MM. A diagnostic device for detection of a biochemical analyte, the diagnostic device comprising a flow cell with a patterned arrangement of fluidic channels configured to provide flow conduits for a sample fluid comprising the biochemical analyte, wherein at least some of the fluidic channels of the flow cell are lined on a surface thereof with: a flexible structured film with a first major surface and a second major surface, wherein a first major surface of the flexible structured film comprises a plurality of posts with an exposed surface extending into the fluidic channels of the flow cell, wherein the posts are interspersed with land areas; an anti-biofouling layer in the land areas, wherein the anti-biofouling layer comprises a methylated surface; a non-methylated inorganic layer on the exposed surfaces of the posts, wherein the inorganic layer comprises an oxide of Si, Ti or Al; and an analyte binding layer on the inorganic layer, wherein the analyte binding layer is chosen from a reactive silane, a functionalizable hydrogel, a functionalizable polymer, and mixtures and combinations thereof, and wherein an exposed surface of the analyte binding layer comprises at least one functional group selected to bind with the biochemical analyte in the sample fluid.

Embodiment NN. A DNA sequencing kit comprising the diagnostic device of Embodiment MM, fluorescent reagents for DNA sequencing; and instructions.

Embodiment OO. A method for DNA sequencing, the method comprising: in a diagnostic device comprising a flow cell with a patterned arrangement of fluidic channels configured to provide flow conduits for a sample fluid comprising a target analyte comprising polynucleotides and nucleic acids, wherein at least some of the fluidic channels of the flow cell are lined on a surface thereof with: a flexible structured film with a first major surface and a second major surface, wherein a first major surface of the flexible structured film comprises an array of posts, and wherein the posts comprise an exposed surface extending into the fluidic channels of the flow cells, and a plurality of land areas between the posts; an anti-biofouling layer in the land areas, wherein the anti-biofouling layer comprises a methylated surface; a non-methylated inorganic layer on the exposed surfaces of the posts, wherein the inorganic layer comprises an oxide of Si, Ti or Al; and an analyte binding layer on the inorganic layer, wherein the analyte binding layer is chosen from a reactive silane, a functionalizable hydrogel, a functionalizable polymer, and mixtures and combinations thereof, and wherein an exposed surface of the analyte binding layer comprises at least one functional group selected to bind with the biochemical analyte in the sample fluid; binding the target analyte in the sample fluid on the analyte binding layer; exposing the target analyte bound on the analyte binding layer to a fluorescent reagent and an enzyme such that the analyte is detected using spectroscopy; and cleaving the fluorescent reagent to allow further interrogation of the target analyte.

Various aspects and advantages of exemplary embodiments of the disclosure have been summarized. The above Summary is not intended to describe each illustrated embodiment or every implementation of the present certain exemplary embodiments of the present disclosure.

The Drawings and the Detailed Description that follow more particularly exemplify certain preferred embodiments using the principles disclosed herein.

BRIEF DESCRIPTION OF DRAWINGS

The disclosure may be more completely understood in consideration of the following detailed description of various embodiments of the disclosure in connection with the accompanying figures, in which.

Figure 1:
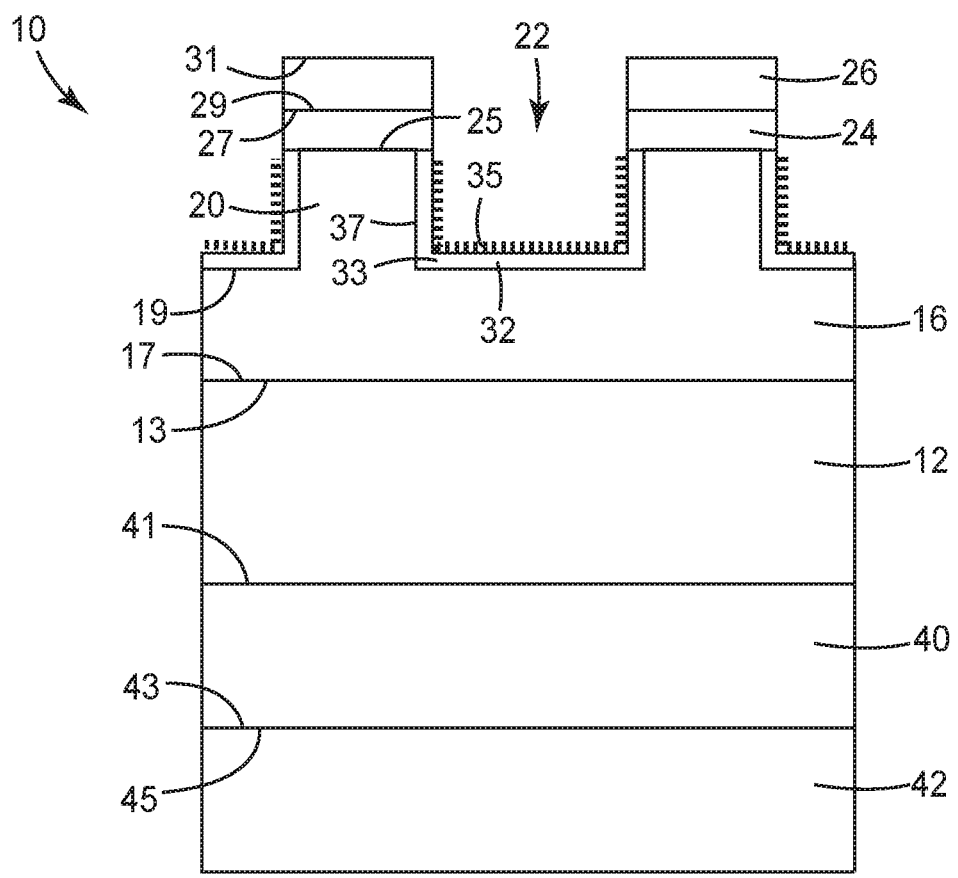
FIG. 1 is schematic cross-sectional view of an embodiment of component article on a nanostructured flexible polymeric carrier substrate according to the present disclosure that includes functionalized posts.

In the drawings, like reference numerals indicate like elements. While the above-identified drawings, which may not be drawn to scale, set forth various embodiments of the present disclosure, other embodiments are also contemplated, as noted in the Detailed Description. This Detailed Description describes representative exemplary and presently-preferred embodiments. It should be understood that numerous other modifications and embodiments can be devised by those skilled in the art, which fall within the scope and spirit of this disclosure and the claims.

DETAILED DESCRIPTION

For the following defined terms, these definitions shall be applied for the entire application, unless a different definition is provided in the claims or elsewhere in the specification.

By using terms of orientation such as "atop", "on", "over", "covering", "uppermost", "underlying", "overlaying" and the like for the location of various elements in the disclosed multi-layer articles, we refer to the relative position of an element with respect to a horizontally-disposed, upwardly-facing substrate. However, unless otherwise indicated, it is not intended that the substrate or articles should have any particular orientation in space during or after manufacture.

By using the term "overcoated" to describe the position of a layer with respect to a substrate or other layer of an article of the present disclosure, we refer to the layer as being atop the substrate or other element, but not necessarily contacting or contiguous to either the substrate or the other layer.

By using the term "separated by" to describe the position of a layer with respect to other layers, we refer to the layer as being positioned between two other layers but not necessarily contiguous to or adjacent to either layer.

The terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an" and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art using the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described embodiments, but are to be controlled by the limitations set forth in the claims and any equivalents thereof.

Referring now to FIG. 1, a schematic illustration (which is not to scale) of a portion of a component article 10 includes a flexible structured film 16 with a first structured major surface 19 and an opposed second major surface 17. The flexible structured film 16 may include any polymeric material suitable or amenable for use in a roll-to-roll process.

In some embodiments, the material and thickness of the flexible structured film 16 should be selected to achieve a low autofluorescence to provide a low-noise background for biological assays in which, for example, fluorescent biological structures, fluorescent markers or fluorophores are used for analysis. For example, detection of DNA or RNA nucleotide sequences can be performed using fluorescent molecules. In other examples, which are not intended to be limiting, the fluorescent molecules can be labeled nucleotides, such as reversible terminators, or labeled oligonucleotide probes. In some instances, different labeled nucleotides or probes in a reagent kit are labeled with different fluorophores that emit different wavelengths depending on the specific sequence to enable multiple bases to be called in a single scan. An auto-fluorescent flexible structured film 16 could potentially drown out the signal from these fluorescent sequencing reagents. In some examples, polymeric resins can optionally be modified to reduce fluorescence, which can make possible the use of a wider variety of polymeric materials for the flexible structured film 16. In some examples, which are not intended to be limiting, the flexible structured film 16 should have an autofluorescence measured between 400 nm and 800 nm, or between 450 nm and 650 nm, similar to that of borosilicate glass or other substrates commonly used in biological assays.

Autofluorescence is not a single number, as the spectrum emitted depends on the excitation wavelength, and a particular polymeric material can have high or low autofluorescence depending on the wavelength. In some examples, to provide low autofluorescence to detect a wide variety of biological detection molecules, cyclic olefin copolymers (COP) or biaxially oriented polypropylene (BOPP), which each have low autofluorescence across a wide spectrum, can be used. Other examples of suitable low autofluorescent polymeric materials include, but are not limited to, poly (meth)acrylates and copolymers thereof, wherein (meth) acrylates include acrylates and methacrylates, polyamides, polyesters, polycarbonates such as, for example, those available under the trade designation Makrolon from Covestro AG (Pittsburgh, PA), hydrogenated styrenics such as, for example, cyclic block copolymers available from Vivion, Inc., (San Carlos, CA) and mixtures and combinations thereof. In some embodiments, the (meth)acrylates may be curable with ultraviolet (UV) radiation.

In various embodiments, the flexible structured film 16 can include a single, or multiple layers of any of these polymers, and can have a total thickness of about 25 nm to about 1000 µm. In some examples, the structured film 16 can be made from a more autofluorescent material and then made thinner to reduce the autofluorescence of the layer 16.

A second major surface 19 of the flexible polymeric carrier film 16 includes a plurality of structures 20 extending away therefrom. The structures 20 are interspersed with land areas 22 therebetween. In various embodiments, which are not intended to be limiting and provided as an example, the structures 20 may be arranged on the surface 19 in a regular or an irregular array, and the structures 20 may be present in all or a portion of the surface 19. In the embodiment of FIG. 1, the structures 20 are generally cylindrical columns or posts, but the structures 20 may also have shapes such as spherical, pyramidal, cuboid, and the like. The structures 20 may include a wide variety of cross-sectional shapes such as, for example, substantially rectangular, arcuate, trapezoidal, cubic, and the like.

In various embodiments, the surface 19 of the flexible polymeric carrier film 16 may be structured by a wide variety of processes including, but not limited to, microreplication against a structured tool, casting, microcontact or inkjet printing, chemical treatment, laser patterning, and combinations thereof. In some embodiments, which are provided as an example, the plurality of structures 20 includes a regular array of cylindrical or cuboid posts with a diameter d of about 100 nm to about 1500 nm, or about 200 nm and 500 nm, and height h above the surface 19 of greater than 0 nm and up to about 1000 nm, or about 50 nm to about 200 nm. In some example embodiments, the posts have an aspect ratio (height:diameter) of about 5:1 to about 1:70, or about 5:1 to 1:5, or about 2:1 to 1:1. In some embodiments (not shown in FIG. 1), the posts 20 can optionally be tapered with a taper angle of greater than 0° and less than about 25°, or about 2° to about 10°, measured with respect to a plane of the surface 19.

The structures 20 include an inorganic layer 24 with a first major surface 25 and a second major surface 27. In some example embodiments, the inorganic layer 24 has a thickness of less than about 200 nm, or less than about 100 nm, less than about 50 nm, or even less than about 20 nm. The composition of the inorganic layer 24 may vary widely, but in some examples, which are not intended to be limiting, includes silicon oxides such as $SiO_2$, $SiC_xO_y$, or $SiAl_xO_y$, as well as TiO, aluminum oxides $AlO_x$, oxides of other metals such as Au, Sn, Ge, Ga, Zn, and In, and mixtures and combinations thereof. In contrast to traditional wafer processing, amorphous silicon oxide deposited by roll-to-roll processing may include impurities such as aluminum or carbon, which can make possible more efficient deposition rates on flexible, temperature sensitive surfaces using, for example, sputtering or PECVD technology.

In some embodiments, a silane with reactive functionality is condensed on at least the second major surface 27 of the inorganic layer 24. The reactive functionality is selected to grow an analyte binding layer 26 on at least the second major surface 27 of the inorganic layer 24, or to graft the analyte binding layer 26 to at least the second major surface 27 of the inorganic layer 24. Suitable reactive functional groups for the silane include, but are not limited to, epoxides, oxiranes, aziridines, isocyanates, alcohols, thiols, amines, chloromethylbenzyl, bromomethylbenzyl, iodomethylbenzyl, alkyl halides, vinyl, carbonyls such as aldehydes and ketones, carboxylic acids, esters, azides, sulfates, phosphates, alkenes, alkynes, (meth)acrylates, (meth)acrylamides, norbomenes, diazonium salts, hydrazines, hydrazones, oximes, halogens, hydroxyls, tetrazoles, tetrazines and mixtures and combinations thereof. In some embodiments, the functional group is a photoreactive functional group such as benzophenone, aryl azide, halogenated aryl azide, diazos, or azos that can be used to grow or graft the analyte binding layer using radical chemistry. In some embodiments, norbomene silanes have been found to be particularly useful.

In some examples, the condensed reactive silane functionality is selected to provide a covalent bond at an interface between at least the second major surface 27 of the inorganic layer 24 and a first major surface 29 of the analyte binding layer 26. For example, the analyte binding layer 26 is covalently bound to the inorganic layer 24 through reaction with the condensed functional silane having any of the reactive functional groups listed above. Suitable examples of functional silanes include, but are not limited to, an acrylate silane, an aminosilane, an acrylamide silane, a norbornene silane, and mixtures and combinations thereof.

The reactive functional groups derived from the functional silane are separated from the inorganic layer 24 by hydrocarbon linking groups that more effectively bond the analyte binding layer 26 and the inorganic layer 24. The hydrocarbon linking group is at least one methylene unit long, and in various embodiments can include about 1 to about 20 carbon atoms, or about 2 to about 15 carbon atoms. In various embodiments, the hydrocarbon linking group can be linear, cyclic, branched, or aromatic, and can optionally include heteroatoms such as, for example oxygen, nitrogen, sulfur, phosphorus and combinations thereof.

The analyte binding layer 26 includes reactive functionality selected to bind with a target analyte. In some cases, the reactive functionality can be the same or different with respect to the reactive functionality used to covalently bind to the inorganic layer 24. In various embodiments, which are not intended to be limiting, the reactive functional groups within or on a second major surface 31 of the analyte binding layer are selected to bind biomolecules chosen from amino acids, nucleosides, nucleotides, peptides, oligonucleotides, polynucleotides, nucleic acids, proteins, carbohydrates, secondary metabolites, pharmaceutical molecules and mixtures and combinations thereof, as well as undesirable chemical contaminants found in liquid aqueous streams and water supplies.

In some cases, the biomolecules are modified with chemistry that facilitate covalent attachment to the analyte binding layer. In some cases, the biomolecule can be used to bind additional analytes. For example, not intending to be limiting, the molecule is an oligonucleotide primer or a mixture of oligonucleotide primers that can bind complementary DNA or RNA molecules, an antibody, or a carbohydrate that can bind a lectin.

In various embodiments, the analyte binding layer 26 is made of a functionalized material chosen from a reactive silane, a functionalizable hydrogel, a functionalizable polymer, and mixtures and combinations thereof. Suitable reactive functional groups for these functionalized materials include, but are not limited to, substituted and unsubstiuited alkene, azide, alkyne, substituted and substituted amine, carboxylic acid, substituted and unsubstituted hydrazone, halogen, hydroxy, substituted and unsubstituted tetrazole, substituted and unsubstituted tetrazine, thiol, epoxide, carbonyls included aldehyde and ketone, aziridines, oxiranes and combinations thereof. In one example, which is not intended to be limiting, DNA primer oligomers can be used which have alkynes that can be conjugated to an azide-functionalized hydrogel.

In some embodiments, the analyte binding layer 26 includes a polymer or hydrogel of Formula (Ia) or (Ib) below:

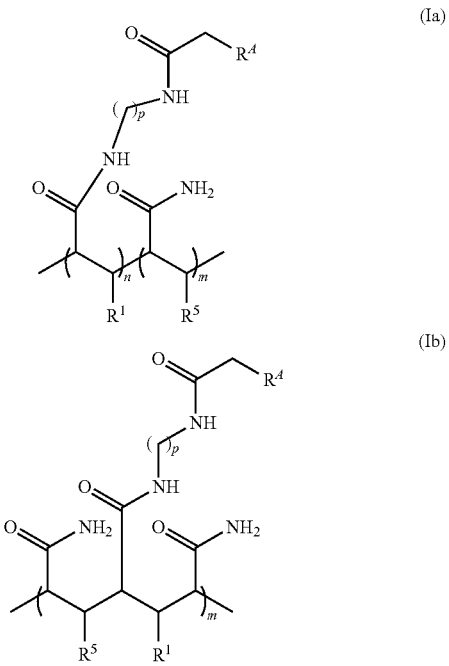

In Formulas Ia and Ib, $R^1$ is H or optionally substituted alkyl; the functional group $R^4$ is selected from the group consisting of azide, optionally substituted amine, optionally substituted alkene, optionally substituted hydrazone, carboxylic acid, halogen, hydroxy, optionally substituted tetrazole, optionally substituted tetrazine, and thiol; $R^5$ is selected from H or optionally substituted alkyl; each of the —$(CH_2)$-p can be optionally substituted: p is an integer in the range of 1 to 50; n is an integer in the range of 1 to 50,000; and in is an integer in the range of 1 to 100,000. In some such embodiments, the functional groups include azides. In some embodiments, each $R^1$ and $R^5$ is hydrogen. In some embodiments, the functional group $R^4$ is azide. In some embodiments, p is 5.

In one embodiment, the polymer or hydrogel included in the functionalizable layer is PAZAM. Methods for making and using PAZAM, and other functionalizable materials that can be used in a layer of a substrate of the present disclosure are described in U.S. Pat. No. 9,012,022, the subject matter of which is incorporated herein by reference in its entirety.

Examples of reactive silanes that can be used include, but are not limited to, (meth)acrylate functional silanes. (meth) acrylamide functional silanes, aldehyde functional silanes, amino functional silanes, anhydride functional silanes, azide functional silanes, carboxylate functional silanes, phosphonate functional silanes, sulfonate functional silanes, epoxy functional silanes, ester functional silanes, vinyl functional silanes, olefin functional silanes, halogen functional silanes and dipodal silanes with any or none of the above functional groups. Norbomene silanes have been found to be particularly useful.

The choice of silane functionality can be made based on the reactivity of the material to which it will react. For example, the acrylamide or norbomene-functionalized silane can react with azide-functionalized polymers. Amino-functionalized silanes can reaction with carbonyl-functionalized polymer where the carbonyl is a carboxylic acid, an ester, an aldehyde, a ketone and activate ester and combinations thereof. Silanes with photoactive functionality such as benzophenones, diazos, or azidobenzyls can be used to graft any polymer with hydrocarbon linkages through hydrogen abstraction.

In some embodiments, the analyte binding layer 26 can include a hydrogel. Non-limiting examples of hydrogels are described in U.S. Pat. No. 9,012,022 and include polyacrylamide hydrogels and polyacrylamide hydrogel-based arrays. Other hydrogels are poly(meth)acrylate hydrogels and poly(meth)acrylate-based arrays. Once hydrogels have been formed, biomolecules may then be attached to them to produce molecular arrays. The hydrogel may be modified chemically after it is produced. For example, the hydrogel may be polymerized with a co-monomer having a functionality primed or pre-activated to react with the biomolecules to be arrayed. In some examples, the array is formed at the same time as the hydrogel is produced by direct copolymerization of acrylamide-derivatized polynucleotides. In one example, acrylamide phosphoramidite available from Mosaic Technologies, Boston, MA, under the trade designation ACRYDITE can be reacted with polynucleotides prior to copolymerization of the resultant monomer with acrylamide.

In some embodiments, the analyte binding layer 26 includes a polymer with one or more functional groups reactable with biomolecules of interest. In some such embodiments, the functional group can be chosen from substituted and unsubstituted alkene, azide, substituted or unsubstituted amine, carboxylic acid, substituted or unsubstituted hydrazone, halogen, hydroxy, substituted or unsubstituted tetrazole, substituted or unsubstituted substituted tetrazine, thiol, and combinations thereof.

In some embodiments, the polvmer of Formula (Ia) or (Ib) is also represented by Formula (IIa) or (IIb).

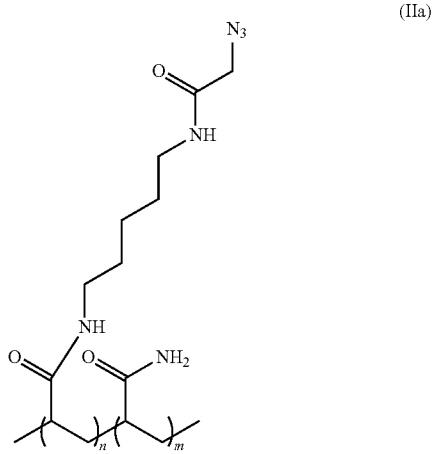

(IIa)

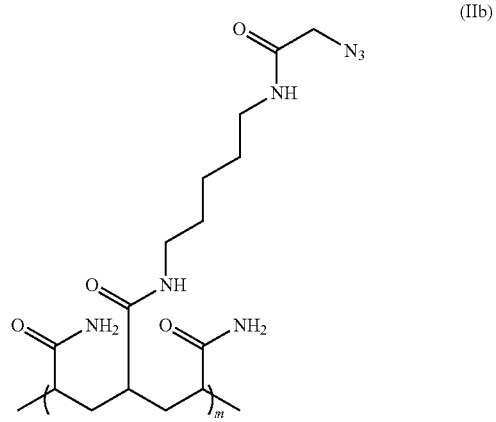

(IIb)

wherein n is an integer in the range of 1-20.000, and m is an integer in the range of 1-100.000.

In some embodiments, the functionalized molecule used for direct conjugation is poly(N-(5-azidoacetamidylpentyl) acrylamide-co-acrylamide) (PAZAM) PAZANM can be prepared by polymerization of acrylamide and Azapa (N-(5-(2-azidoacetamido)pentyl)acrylamide) in any ratio. In various embodiments. PAZAM is a linear polymer, a lightly cross-linked polymer, may be supplied m an aqueous solution, or may be supplied as an aqueous solution with one or more solvent additives. For example, in some embodiments the arylazide containing polymers described in US20190232890 may be used.

Referring again to FIG. 1, in some embodiments, the analyte binding layer 26 may include at least one photocurable polymer chosen from urethane, acrylate, silicone, epoxy, polyacrylic acid, polyacrylates, epoxy silicone, epoxy resins, polydimethylsiloxane (PDMS), silsesquioxane, acyloxysilanes, maleate polyesters, vinyl ethers, monomers with vinyl or ethynyl groups, or copolymers and combinations thereof.

As shown schematically in FIG. 1, the structured surface 19 of the flexible polymeric carrier film 16 in the land areas 22 between the structures 20 is free of the analyte binding layer 26, and includes thereon an anti-biofouling layer 32. For example, the anti-biofouling layer 32 can include a first major surface 33 contacting the surface 19 of the carrier film 16, and a second major surface 35 that is exposed in the land areas 22. In some embodiments, the anti-biofouling layer 32 may be the same bulk composition as the inorganic layer 24 and have a different surface composition on the exposed surface 35. In some embodiments, the anti-biofouling layer 32 may in some cases also be present on all or a portion of the walls 37 of the structures 20.

The exposed surface of the anti-biofouling layer 35 can include any material that resists or prevents accumulation or formation of biological species such as, for example, microorganisms, or biomolecules such as nucleic acids and proteins. The exposed surface of the anti-biofouling layer 35 thus prevents target analytes, sequencing reagents or fluorophores from non-specifically adhering to at least a portion of the interstitial regions or land areas 22 between the structures 20. If the anti-biofouling layer 32 is applied in a particular region of the component article 10, other regions uncoated by the anti-biofouling layer 32 may be bound with a biological sample. Since the anti-biofouling surface 35 is in the land areas 22, and absent from exposed surfaces on top surface 27 of the inorganic layer 24, the biological material can bind to an analyte binding material 26 on the tops of the structures 20. The surface 35 of the anti-biofouling layer 32 thus provides specific placement of the analyte binding material (and the biological material bound thereto) in one or more areas of the component article 10.

The exposed surfaces 35 of the anti-biofouling layer 32 include a plurality of methyl ($CH_3$) groups. The exposed surface 35 of the anti-biofouling layer 32, which is hydrophobic and relatively non-reactive like, for example, a silicone material, may include any composition having a surface rich in methyl groups. The anti-biofouling layer 32 thus forms a release layer in the land areas 22. In one example, which is not intended to be limiting, the methyl groups are formed through plasma enhanced chemical vapor deposition (PECVD) of hexamethyldisiloxane, which forms a thin surface 35 having a thickness of about 1 nm to about 10 nm, or about 2 nm to about 8 nm. The methyl groups in the thin film are attached to Si atoms in the anti-biofouling layer 32, and provide a hydrophobic non-reactive layer in the land areas 22.

In some examples, the methyl-terminated surface 35 of the anti-biofouling layer 32 is sufficiently rich in methyl groups to provide a water contact angle greater than 100 degrees. In some examples, the methyl groups can be formed from molecular fragmentation of hexamethyldisiloxane through plasma dissociation, although any method of creating a methyl-terminated surface on a metal, metalloid, metal oxide, or metalloid oxide may provide similar functionality.

Another example of forming an anti-biofouling surface on an inorganic layer includes reaction of silanes with a hydrolytically sensitive center having an organic substitution that contains a methyl group. Examples of hydrolytic reactive groups are chloro, methoxy, ethoxy, propoxy, methoxyalkoxy, acetoxy, amines such as, for example, dimethylamine, silazane, or oxime. Examples of organic substitutions include methyl, linear alkyl, branched alkyl, aryl, and dipodal. In various examples, silanes can be applied by vapor phase deposition, spray, or solvent coating.

Other chemistries such as tetraethyl orthosilicate, tetramethylsilane, hexamethyldisilane, bis(trimethylsilyl)amine, trimethylamine, tetramethyltin, and other analogous metal alkyl compounds may be deposited using plasma enhanced chemical vapor deposition to create methyl terminated surfaces. In addition, precursors such as trimethylamine may form a monolayer of methyl groups on an appropriate surface using atomic layer deposition.

An optional polymeric support film 12 underlies the flexible structured film 16, and in the embodiment of FIG. 1 includes a first major surface 13 and a second major surface 15. The first major surface 13 of the support film 12 underlies the second major surface 17 of the carrier film 16. In some embodiments, the first major surface 13 of the support film 12 may optionally be roughened, chemically treated, corona treated and the like to enhance adhesion to the carrier film 16. Suitable surface modification techniques for the first major surface 13 of the support film 12 include, for example plasma enhanced chemical vapor deposition (PECVD).

The composition of the support film 12 may vary widely, and in various embodiments may include any of the low-autofluorescent polymeric materials utilized for the flexible structured film 16. In some embodiments, which are not intended to be limiting, the support film 12 may be chosen from poly(meth)acrylates and copolymers thereof, wherein (meth)acrylates include acrylates and methacrylates, polypropylene, hydrogenated styrenics, poly(meth)acrylates, polycarbonates, and mixtures and combinations thereof.

In some embodiments, the (meth)acrylates may be curable with ultraviolet (UV) radiation. The thickness of the support film 12 may be adjusted as necessary to control the overall autofluorescence of the layers 12, 16.

In some embodiments, the second major surface 15 of the polymeric support film 12 includes an optional adhesive layer 40. Any adhesive may be used in the adhesive layer 40, but low auto-fluorescent materials have been found to be particularly suitable for use in analytical devices for biochemical analytes. In some examples, which are not intended to be limiting, the adhesive layer 40 includes optically clear adhesives such as those available from 3M under the trade designation 3M OPTICALLY CLEAR ADHESIVE 8171, as well as polyisobutylene polymer adhesives. Suitable isobutylene adhesives can include styrene-isobutylene copolymers, or with multifunctional components such as (meth)acryl and vinyl ether groups.

In some examples, which are not intended to be limiting, the adhesive layer 40 has a thickness of about 1 µm to about 50 µm, or about 5 µm to about 15 µm. In some embodiments, the adhesive layer 40 should be sufficiently uniform so that a focal plane of the exposed surfaces of the analyte binding layer 26 (second major surface 31 in FIG. 1) does not vary by more than about 5 µm, or more than about 2 µm, or more than about 1 µm, 500 nm, 250 nm or 100 nm.

A surface 41 and or 43 of the adhesive layer 40 may optionally be structured with, for example, a network of air bleed channels, to reduce trapped air when the adhesive layer 40 is applied to a flat surface of a rigid substrate such as a glass plate. In some embodiments, the adhesive layer 40 may be a repositionable adhesive, and may optionally include glass beads, adhesives with low green strength, vacuum lamination, and the like.

The adhesive layer 40 can be applied on the second major surface 15 of the polymeric support film 12 using a wide variety of techniques including, coating directly on the surface 15, or via lamination of a transfer adhesive to the flexible substrate 12.

In some examples, the adhesive layer 40 is attached to an optional reinforcing layer or rigid substrate 42, which may provide increased rigidity so the component article 10 can be more readily used in commonly utilized in apparatus for performing biochemical assays. The reinforcing layer 42 may vary widely, and in various embodiments includes silicon, glass, plastic, metal, metal oxide, paper, and combinations thereof. In various embodiments, the reinforcing layer 42 may include a single layer or multiple layers. In some embodiments, a major surface 45 of the rigid substrate 42 may optionally be treated to enhance removal of the adhesive layer 40.

In another embodiment, the reinforcing layer 42 can be a release liner that protects the adhesive layer 40 and may be peeled away from the adhesive layer 40 such that the component article can be applied to a selected substrate prior to use in an apparatus for performing biochemical assays. Suitable release liners 42 include, but are not limited to, polymeric films, paper, metals, metal oxides, and combinations thereof. The release liner 42 may include single or multiple layers.

Figure 2:
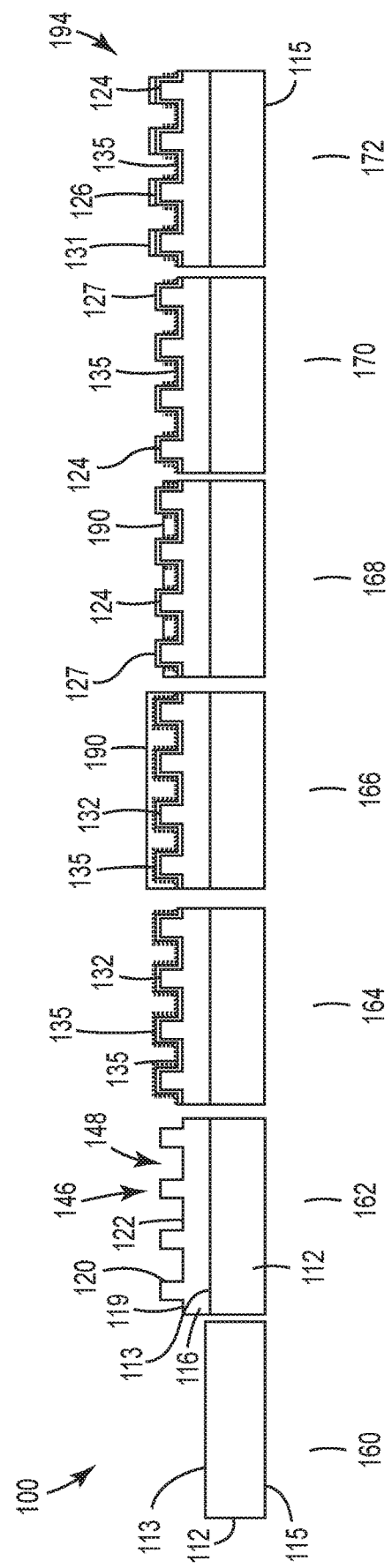
FIG. 2 is a schematic cross-sectional view of an example embodiment of a process for making the article of FIG. 1.

FIG. 2 is a schematic representation of an embodiment of process 100 for forming a component article with functionalized analyte binding posts exemplified by the article 10 of FIG. 1. In various embodiments, the process 100 may be performed on a production line in a roll-to-roll process to make a component article on a polymeric support layer, or the individual articles may be individually produced.

In step 160, a polymeric support film 112 with a first major surface 113 and a second major surface 115 is utilized as a low auto-fluorescent backing substrate for the component article. As noted above, suitable support films 112 include low-autofluorescent materials such as, for example, COP, PET, and the like.

In some embodiments, the first major surface 113 of the support film 112 can optionally be roughened to enhance adhesion to subsequent layers. In one example, the surface 113 can be roughened by plasma enhanced chemical vapor deposition (PECVD), but can also be roughened by contacting the surface with a tool or with another structured film. In another example, which is not intended to be limiting, the surface 113 can be modified by adding random nanostructures by depositing a silicon containing discontinuous layer using plasma enhanced chemical vapor deposition (PECVD), while either simultaneously or sequentially etching the surface with a reactive species as described in U.S. Pat. Nos. 10,134,566 and 8,634,146, respectively, which are incorporated herein by reference in their entireties.

In step 162, a flexible structured film 116 is transferred onto the surface 113 of the carrier film 112. The structured film 116 includes a structured surface 119.

In some embodiments, the flexible structured film 116 is prepared by casting and curing a polymerizable resin on the support film 112. As described in Lu et al., U.S. Pat. No. 5,175,030, and Lu, U.S. Pat. No. 5,183,597, an article can be prepared by a method including the steps of depositing a polymerizable composition onto a master negative microstructured or nanostructured molding surface in an amount barely sufficient to fill the structure of the master, or filling the structure by moving a bead of the polymerizable composition between the support film 112 and the master molding surface, at least one of which is flexible, curing the composition and separating the structured film 116 from the master molding surface. In other examples, the surface 119 of the flexible structured film 116 may be structured by a wide variety of processes including, but not limited to, microreplication against a structured tool, microcontact or inkjet printing, chemical treatment, laser patterning, and combinations thereof.

Figure 3:
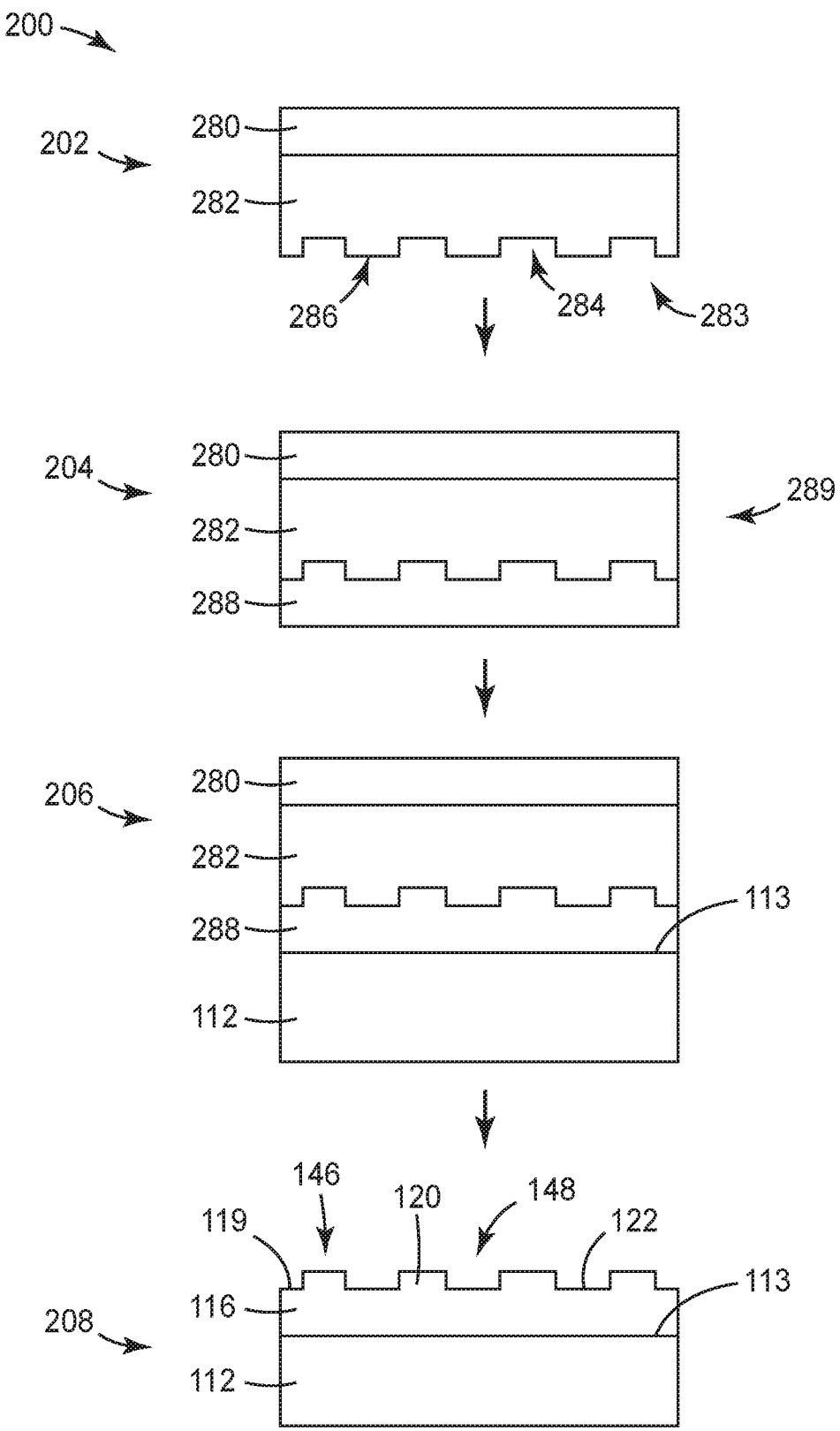
FIG. 3 is a schematic cross-sectional view of an embodiment of low-land transfer process which can be utilized in the process of FIG. 2.

In another embodiment, the transfer of the structured film 116 onto the surface 113 of the support film 112 is described in an embodiment of the process 200 of FIG. 3. The steps of the process 200 may be conducted in a number of different sequences, and the order of steps in FIG. 3 is not intended to be limiting.

As shown in step 202 in FIG. 3, an optional support layer 280 includes a patterned layer 282. As noted above, the patterned layer 282 may be structured by a wide variety of processes including, but not limited to, microreplication against a structured tool, casting, microcontact or inkjet printing, chemical treatment, laser patterning, and combinations thereof. The patterned layer 282 includes a patterned surface 283 including one or more recessed features 284, each recessed feature adjoining at least one plateau feature 286.

In step 204, a structured layer 288 is applied on the patterned surface 283 of the patterned layer 282 to form a transfer construction 289.

In step 206, the transfer construction 289 formed in step 204 is laminated to the first major surface 113 of the polymeric support film 112 shown in step 160 of FIG. 2.

In step 208, the structured layer 288 of the transfer construction 289 is separated from the patterned layer 282, leaving behind the flexible structured film 116 with a patterned surface 119 (FIG. 2). The patterned surface 119 includes an arrangement of post-like structures 120 interspersed with land areas 122. The patterned surface 119 includes a pattern of projections 146 and land areas 148 that is an inverse of the pattern of recessed features 284 and plateau feature 286 in the surface 283. The process 200 thus provides a low-land transfer of a structured surface layer 116 to the polymeric support film 112, with the result shown in step 162 of FIG. 2.

In one example embodiment, the structured film 116 is a UV-curable (meth)acrylate with a patterned surface 119 having an arrangement of posts 146 with diameters of about 100 nm to about 1500 nm, or about 200 nm and about 500 nm, which are interspersed with an arrangement of land areas 148. In various embodiments, which are not intended to be limiting, the aspect ratio of the posts 146 in the patterned surface 119 is about 5:1 to about 1:5 (height:diameter), or about 2:1 and 1:1 (height:diameter). In some embodiments (not shown in FIGS. 2-3), the posts 120 can optionally be tapered with a taper angle of greater than 0° and less than about 25°, or about 2° to about 10°.

Referring again to FIG. 2, in step 164 of the process 100, an anti-biofouling layer 132 with a methyl-rich surface 135 is applied on the surface 119 of the carrier film 116 to form a release coating thereon. In some example embodiments, which are not intended to be limiting, the layer 132 includes a plasma polymerized material with a composition including $SiC_xH_y$, and is applied on the surface 119 of the carrier film 116. In some examples, which are not intended to be limiting, the layer 132 can be deposited on the surface 119 roll-to-roll by plasma enhanced chemical vapor deposition (PECVD) or sputtering of hexamethyldisoloxane.

The layer 132 forms a release coating on the posts 120 and the land areas 122 of the surface 119 of the carrier film 116 that includes amorphous $SiC_xH_y$ with a methylated Si surface 135, which is colloquially called a HMDSO treatment. The methylated Si surface 135 is rich in methyl ($CH_3$) groups attached to Si atoms and includes a non-reactive hydrophobic surface that in some examples is similar in reactivity to that of a silicone. Other examples of materials for the layer 132 are mixtures and combinations of silicon, carbon, hydrogen, aluminum, tin, germanium, gallium, zinc, and indium, where the surface 135 is a methyl or other hydrocarbon.

In various embodiments, the thickness of the layer 132 is about 1 nm to about 200 nm, about 1 nm to about 50 nm, about 2 nm to about 10 nm, or about 2 nm to about 8 nm.

In step 166, a planarizing layer 190 is applied over the inorganic layer 132 to overcoat the posts 120 and the land areas 122. In various embodiments, which are not intended to be limiting, the planarizing layer 190 is a polymeric resin such as, for example, polyvinylbutyral (PVB), polyvinyl alcohol (PVA), (meth)acrylates and the like.

In step 168, an oxygen-rich reactive ion etching (RIE) step is used to remove a portion of the planarizing layer 190 and the methylated surface 135 to form an inorganic layer 124 with a non-methylated inorganic surface 127 on the posts 120, while leaving the planarizing layer overlying the land areas 122. In some embodiments, fluorine can optionally be added to the etchant if the planarizing layer 190 includes Si. The depth of the etch can be controlled based on the duration and selectivity of the etch to remove a desired portion of the planarizing layer 190.

The addition of oxygen from the etchant provides a composition for the inorganic layer 124 that may vary widely, but in some examples, which are not intended to be limiting, includes silicon oxides such as $SiO_2$, $SiC_xO_y$, or $SiAl_xO_y$, as well as TiO, aluminum oxides $AlO_x$, oxides of other metals such as Au, Sn, Ge, Ga, Zn, and In, and mixtures and combinations thereof. In some cases, a remnant of the layer 132 may remain underneath the layer 124. In some embodiments, an exposed surface of the planarizing layer 190 can optionally be structured to enhance adhesion to or release from subsequently applied layers.

The etching step modifies the chemical composition of the methyl rich surface 135 to form the non-methylated inorganic surface 127. The oxygen-containing etchant removes substantially all the methyl groups from the surface 127, and produces thereon a more reactive silica-like surface including exposed silanol groups, which is useful for subsequent bonding steps.

In step 170, the planarizing layer 190 is removed by any suitable technique to expose the methylated surfaces 135 in the land areas 122. In various embodiments, the planarizing layer 190 can be removed by attaching an adhesive and peeling, or by coating a UV-curable acrylate, laminating with a carrier film, curing, and peeling. In another embodiment, the planarizing layer 190 can be removed by washing with solvent, a mask remover solution, or water, optionally using agitation such as ultrasonics or spray. In some embodiments, surfaces of the planarizing layer 190 can optionally be roughened or structured to assist with the peeling process.

In step 172, an analyte binding layer 126 of, for example, a functional alkoxy silane, overlies the inorganic layer 124 and is bound to the exposed surface 127 thereof to form a component construction 194 for use in, for example, a biochemical assay. The analyte binding layer 126 does not react with or bond to the methylated surface 135 within the land areas 122.

In some example embodiments, the silane in the analyte binding layer 126 includes a reactive group that can be used to form a hydrogel polymer on the posts 120. In one example, which is not intended to be limiting, the alkoxysilane contains an acrylamide functional group. After post functionalization, the acrylamide in the analyte binding layer 126 is polymerized on the surface, leading to growth of poly(acrylamide) on the posts 120. In another embodiment, the silane in the analyte binding layer 126 is reacted directly with an acrylamide silane.

In another embodiment not shown in FIG. 2, the analyte binding layer 126 can optionally be applied on the surface 127 in step 168 prior to removal of the planarizing layer 190 in step 170.

While not shown in FIG. 2, as discussed above, in some embodiments, an optional adhesive layer may be applied on a second major surface 115 of the support film 112 of the component construction 194. The adhesive layer may include an optional protective release liner, which may be removed so that the adhesive-backed component construction 194 may be affixed to a reinforcing layer such as glass, paper, a polymeric film, or the like.

The components and devices described above can be used in a wide variety of biochemical analysis procedures including, but not limited to, DNA sequencing tests. For example, a diagnostic device for DNA sequencing can include a flow cell with a patterned arrangement of fluidic channels configured to provide flow conduits for a sample fluid with a target analyte including polynucleotides and nucleic acids.

At least some of the fluidic channels of the flow cell can be lined on a surface thereof with posts including an analyte binding layer bonded to an underlying Si oxide layer by a network of methylene groups, the target analyte in the sample fluid is bound on the analyte binding layer, and the bound target analyte is exposed to a fluorescent reagent such that the analyte is detectable using spectroscopy.

In another example, the diagnostic device could be included in a DNA sequencing kit, a kit for detection of an environmental contaminant, a kit for detection of a particular viral or bacterial pathogen, and the like. The kit can include the diagnostic device along with reagents selected for the particular assay to be performed with the diagnostic device, such as fluorescent reagents, as well as appropriate instructions for use of the diagnostic device to conduct a particular assay or group of assays.

The operation of the present disclosure will be further described with regard to the following detailed examples. These examples are offered to further illustrate the various specific and preferred embodiments and techniques. It should be understood, however, that many variations and modifications may be made while remaining within the scope of the present DISCLOSURE.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

Unless otherwise noted or readily apparent from the context, all parts, percentages, ratios, etc. in the Examples and the rest of the specification are by weight. Materials and reagents used in the examples below are set forth in Table 1 below.

TABLE 1

| Materials and Source | |
|---|---|
| Abbreviation | Description and Source |
| Acrylate Resin A | 13 wt % Acrylate resin A, 1 wt % HFPO-UA solution, 43 wt % MEK, 43 wt % PGME |
| Acrylate Resin A | 75 wt % Photomer 6210 with 25 wt % SR238 and 0.5% TPO |
| PHOTOMER 6210 | Urethane Acrylate Oligomer PHOTOMER 6210 (IGM Resins, Charlotte, NC) |
| SR238 | 1,6-Hexandiol Diacrylate; SR238 (Sartomer Americas, Exton, PA) |

TABLE 1-continued

Materials and Source

| Abbreviation | Description and Source |
| --- | --- |
| SR351 | Trimethylopropane Triacrylate; SR351 (Sartomer Americas, Exton, PA) |
| PVB 30H | Mowital ® Polyvinyl Butyral 30H (Kuraray America Inc, Tokyo, Japan) |
| IPA | Isopropyl Alcohol (Brenntag Great Lakes, Wauwatosa, WI) |
| MEK | Methyl Ethyl Ketone (Brenntag Great Lakes, Wauwatosa, WI) |
| PGME | Propylene Glycol Methyl Ether (Brenntag Great Lakes, Wauwatosa, WI) |
| TPO | Diphenyl(2,4,6- trimethylbenzoyl)phosphine Oxide; IRGACURE TPO (BASF, Florham Park, NJ) |
| HFPO-UA solution | 66% Hexafluoropropyleneoxide Multiacrylate in Acetone (3M Company, St. Paul, MN) |
| Polycarbonate Film | 125-micron thick Polycarbonate Film with a Gloss Surface Finish on Both Sides (Tekra, Inc. New Berlin, WI) |
| Melenex 454 | Polyester Film; MELENEX 454 (Tekra, Inc. New Berlin, WI) |
| ST505 | Polyester Film; MELENEX ST505 (Tekra, Inc. New Berlin, WI) |
| COP Film | Zeonor Film (Zeon Chemicals LP, San Jose, CA) |
| 3M TM Optically Clear Adhesive 8171 | 25 micron Optically Clear Laminating Adhesive (3M Company, St. Paul, MN) |
| Adhesive group A | Examples disclosed in U.S. Pat. Pub. No. 2020/0095476 |
| Adhesive group B | Examples disclosed in U.S. Pat. Pub. No. 2020/0048511 |
| Adhesive group C | Examples disclosed in U.S. patent application Ser. No. 62/851,326 |
| $O_2$ | Oxygen, UHP Compressed Gas (Oxygen Service Company, Saint Paul, MN) |
| HMDSO | Hexamethyldisiloxane (Gelest, Inc. Morrisville, PA) |
| 3M Optically Clear Adhesive 8187 | 125 micron Optically Clear, Double-sided Adhesive (3M Company, St. Paul, MN) |
| 1M Tris-HCl, pH 7.5 | Invitrogen UltraPure 1M Tris-HCl Buffer, pH 7.5, (Thermo Fisher Scientific, Waltham, MA) |
| HTI Hybridization Buffer | HTI hybridization Buffer (Illumina 15027041, Madison, WI) |
| SYBR Gold dye | Invitrogen SYBR Gold Nucleic Acid Gel Stain, 10,000X Concentrate in DMSO (Thermo Fisher Scientific, Waltham, MA) |
| 96-well clear bottom plate | Thermo Scientific Nunc MicroWell 96-Well Optical-Bottom Plate with Polymer Base and Solid Polystyrene Black Upper Structures with a Polystyrene Film at the Bottom of the Plate (Thermo Fisher Scientific, Waltham, MA) |
| Sealing film for 96-well plates | Applied Biosystems MicroAmp Optical Adhesive Film Kit (Thermo Fisher Scientific, Waltham, MA) |
| Quinine Hemisulfate Monohydrate | Quinine Hemisulfate Monohydrate (Alfa Aesar, Ward Hill, MA) |
| Acrylamide silane | Prepared as described in Wang et. al., *Macromolecules*, 44, 878-885 (2011). |
| Resolve ™ | Microscope Immersion Oil from Criterion Sciences (Cornwell Corp., Riverdale, NJ) |
| APTMS | 3-aminopropyltrimethoxysilane (Alfa Aesar, Ward Hill, MA) |
| EtOH | Anhydrous Ethanol (EMD Millipore, Burlington, MA) |
| HOAc | Acetic Acid (EMD Millipore, Billerica, MA) |
| AF488 NHS Ester | Alexa FluorTM 488 NHS Ester (Succinimidyl Ester) (Thermo Fisher Scientific, Waltham, MA) |
| TE Buffer pH 8 | Invitrogen ™ TE Buffer pH 8 (Thermo Fisher Scientific, Vilnius, Lithuania) |
| 3-azidopropyltriethoxysilane | 3-azidopropyltriethoxysilane (Gelest Inc., Morrisville, PA) |
| Potassium Phosphate Monobasic | Potassium Phosphate Monobasic (VWR International LLC, Radnor, PA) |
| Potassium Phophate Dibasic Trihydrate | Potassium Phophate Dibasic Trihydrate (Sigma Aldrich, St. Louis, MO) |
| Alkyne Oligonucleotide labeled with Fluorescein (Sequence: 5'- Hexynyl - GCG CTG TTC ATT CGC G - Fluorescein - 3') | Alkyne Oligonucleotide Labeled with Fluorescein (Sequence: 5'- Hexynyl - GCG CTG TTC ATT CGC G - Fluorescein - 3') (Integrated DNA Technologies, Coralville, IA) |
| N,N,N',N',N''-pentamethyldiethylenetriamine | N,N,N',N',N''-pentamethyldiethylenetriamine (Sigma Aldrich, St. Louis, MO) |
| Copper sulfate pentahydrate ($CuSO_4 \cdot 5H_2O$) | Copper Sulfate Pentahydrate ($CCuSO_4 \cdot 5H_2O$) (Alfa Aesar, Ward Hill, MA) |

TABLE 1-continued

Materials and Source

| Abbreviation | Description and Source |
| --- | --- |
| Sodium Ascorbate | Sodium Ascorbate (Alfa Aesar, Ward Hill, MA) |
| DNA LoBind ® Tubes | DNA LoBind ® Tubes (Eppendorf Corp., Enfield, CT) |

Test Methods

The following test methods have been used in evaluating some of the Examples of the present disclosure.

Test Method 1: (DNA Adherence)

Step 1: A Portion of sample under test was cut, and one side of a double-sided adhesive was applied to the untreated side of the sample.

Step 2: Punches of samples were obtained (5 mm) and the release liner from back of adhesive was removed with fine tip forceps Step 3: Punches from each sample were attached to the bottom of a 96-well clear bottom plate with the treated side of the same facing up.

Step 4: A DNA mixture was prepared to treat the samples. Five hundred microliters of undiluted, pooled sequencing library (average 15 nM concentration per sample) that was generated using the Illumina Nextera DNA flex library preparation kit (Illumina 20018704) was denatured with 50 µl of 1N NaOH for 5 min.

Fifty microliters of 1M Tris-HCl pH 7.5 was added to the DNA to neutralize, and mixture was vortexed briefly. DNA library was further denatured by heating at 95° C. for 3 min, then snap-cooled on ice. The denatured pooled DNA library was added to 4.5 ml of HT1 hybridization buffer, and the mixture was vortexed at high speed for 30 sec.

Step 5: The mixture from Step 4 was transferred to a reagent reservoir and a multichannel pipet was used to transfer 75 µl into each sample well in the 96-well plate. 75 µl allowed for flooding of entire sample with liquid. Material+dye controls or material only controls received 75 µl of HTI hybridization buffer without DNA.

Step 6: The 96-well plate was securely covered with sealing film and incubated at RT for 1 hour Step 7: Liquid was removed using a multichannel pipet Step 8: One hundred microliters of 20 mM Tris-HCl pH 7.5 containing 1×SYBR gold dye was added to the wells n=4 (rows A-D in FIGS. 9A-9B) and material+dye controls n=2 per sample (rows E and F in FIGS. 9A-9B).

Step 9: One hundred microliters of 20 mM Tris-HCl pH 7.5 without dye added to material only wells n=2 per sample.

Step 10: Fluorescence readings were obtained using an excitation/emission of 495 nm/537 nm, from the top of the plate, with 80% gain using a Synergy Neo 2 BioTek plate reader, to obtain the first measurement designated READING 1.

Liquid was removed from the wells and fresh 20 mM Tris pH 7.5 without dye was added and the plate was read again to obtain the second measurement designated READING 2.

Liquid was removed from the wells and fresh 20 mM Tris pH 7.5 without dye was added and the plate was read again to obtain the third measurement designated READING 3.

Liquid was removed from the wells and fresh 20 mM Tris pH 7.5 without dye was added and the plate was read again to obtain the fourth measurement designated READING 4.

Liquid was removed from the wells and fresh 20 mM Tris pH 7.5 without dye was added and the plate was read again to obtain the fifth measurement designated READING 5.

Liquid was removed from the wells and fresh 20 mM Tris pH 7.5 without dye was added and the plate was read again to obtain the sixth measurement designated READING 6.

Liquid was removed from the wells and fresh 20 mM Tris pH 7.5 without dye was added and the plate was read again to obtain the seventh measurement designated READING 7

Step 11: To determine the relative DNA adherence to test materials, the last fluorescence readings obtained from the material+dye samples was subtracted from the last fluorescence readings obtained from material+DNA+dye samples. Errors were propagated by quadrature.

Test Method 2: Autofluorescence

Samples were measured free standing in the front sample position (sample angled 30 degrees right of normal to incident and detector optics 10 degrees right of normal) on a Perkin Elmer Lambda 1050 spectrophotometer fitted with a PELA 1002 integrating sphere accessory. The scan speed was set to 102 nm/min, the UV-Vis integration was set to 0.56 sec/pt, the data interval was set to 1nm and the slit width was set to 5 nm. The instrument was set to "% Transmission" and "% Reflectance" mode.

For comparison to a known reference, a 10 ppm quinine solution in 0.5N sulfuric acid was prepared from quinine hemisulfate monohydrate and presented in a 10 mm quartz cell.

Test Method 3: (X-ray Photoelectron Spectroscopy)

The sample surfaces were examined using X-ray Photoelectron Spectroscopy (XPS) also known as Electron Spectroscopy for Chemical Analysis (ESCA). This technique provides an analysis of the outermost 3 to 10 nanometers (nm) on the specimen surface. The photoelectron spectra provide information about the elemental and chemical (oxidation state and/or functional group) concentrations present on a solid surface. XPS is sensitive to all elements in the periodic table except hydrogen and helium with detection limits for most species in the 0.1 to 1 atomic % concentration range. XPS concentrations should be considered semi-quantitative unless standards are included in the data set. XPS instrument settings are described in Table 2.

TABLE 2

XPS Instrument Settings

| | |
| --- | --- |
| Instrument | NEXSA, Thermo Fisher Scientific |
| Analysis Area | »400 µm |
| Photoelectron Take-off Angle | 90° ± 30° solid angle of acceptance |
| X-ray Source | Monochromatic Al Kα (1486.6 eV) 72 W |
| Charge Neutralization | Low energy e$^-$ and Ar$^+$ flood sources |
| Charge Correction | none |
| Analysis Chamber Pressure | <5 × 10$^{-7}$ mbar |

Test Method 4: (Time-of-flight Secondary Ion Mass Spectrometry)

The surfaces were analyzed by time-of-flight secondary ion mass spectrometry (TOF-SIMS). TOF-SIMS has monolayer sensitivity to atoms and molecules, with an analysis depth in the range of 1 to 2 nm. SIMS bombards the surface with high energy ionized particles using a liquid metal ion gun causing a collision cascade at the surface of the sample. The SIMS process ejects fragment ions that are extracted and sent through a time of flight (TOF) mass analyzer which can determine with high mass resolution the mass and hence the structure of that ion.

Positive and negative secondary ions are collected in separate analyses. Imaging of the outer 1-2 nm is achieved by rapidly rastering the primary ion beam over the analysis area and recording the location of the secondary ions detected from each primary ion bombardment to judge the surface distribution of the chemistry. TOF-SIMS instrument settings are shown in Table 3 below.

TABLE 3

TOF-SIMS Instrument Settings

| Instrument | Mode | Primary Ion Beam | Primary Ion Beam Size | Analysis Area |
|---|---|---|---|---|
| PHI nanoTOF II | Unbunched (low mass resolution and highest spatial resolution) | 30 keV $Bi_3^{++}$ | ~0.1 μm | 50 μm × 50 μm |

Test Method 5: Chemical Force Microscopy

Atomic Force Microscopy (AFM) is an imaging technique that consists of a flexible cantilever with a sharp tip attached to the cantilever's free end. The cantilever-tip assembly is raster-scanned across a surface to create a topographical image. The forces of interaction between the tip and sample cause the cantilever to deflect as it scans across the surface. The cantilever bending force is described by Hooke's Law: $F_c = k\delta_c$, where k is the cantilever spring constant, F, is the force of the cantilever and $\delta_c$ is the cantilever deflection.

The simplest implementation of AFM is called contact mode wherein a constant force (fixed cantilever deflection) between the probe and sample is maintained using feedback control to generate a topographical image. At each x-y position, the cantilever deflection is measured via a laser beam reflected off the cantilever's backside and detected by a photodiode. The z(x,y) data is used to construct a three-dimensional topography map of the surface. In addition to topographic imaging, AFM can acquire force-distance curves between tip and sample.

A force-distance curve is obtained as the tip approaches towards the surface and withdraws from the surface. A force curve contains a wealth of information regarding the sample properties including adhesion between tip and sample. Adhesion refers to the force where the tip breaks free of the surface of attraction as the tip withdraws from the surface.

Chemical force microscopy (CFM) is an AFM technique which uses a chemically functionalized probe for measuring force curves. The CFM measurements were performed in water environment, in force volume mapping mode, using a Dimension ICON AFM System (Nanoscope V, Bruker, Santa Barbara, CA, USA). CFM adhesion force maps were obtained using $CH_3$-terminated tips (Novascan CT.AU.CH3, Au coating 30 nm, SiN probe, nominal spring constant of 0.32 N/m). The —$CH_3$ group is expected to have higher adhesion towards hydrophobic groups and lower adhesion towards hydrophilic groups.

The spring constant was determined by thermal tune and the deflection sensitivity was established using a sapphire sample in air. Typical force volume maps were obtained at 4 μm×4 μm with 64×64 data points. Ramp size was set at 535 nm and the typical probe forward/reverse velocity was 2.18 μm/s. The trigger force threshold was set at 4 nN.

Test Method 6: Angle Resolved X-ray Photoelectron Spectroscopy(ARXPS)

In angle resolved X-ray photoelectron spectroscopy (ARXPS), the sample is tilted to multiple angles in a serial manner while irradiating the same area of the sample. ARXPS can create a nondestructive depth profile of the sample. This is a particular advantage here as the chemical state information versus depth is important.

Measurements were performed using a Thermo Scientific K-Alpha instrument that employs focused, monochromatic Al K-alpha radiation as the probe beam with surface neutralization accomplished via low energy electron and Ar+ ion flood beams. The x-ray beam size on the sample surface was ~400 μm. The photoelectron detection used an input lens with ±30° solid angle of acceptance. Spectral data were acquired with 25 eV pass energy and analyzed using Thermo Avantage v5.9915 software.

Test Method 7: Confocal Microscopy

The samples with fluorescent labels were imaged using a confocal microscope (Zeiss Axioplan 2 with LSM 510 Laser Module, Zeiss, Thornwood N.J.) equipped with an Achroplan 63×/1.4 Oil DIC M27 (FWD=0.19 mm) objective. The film samples were adhered on a 1 in ×3 in microscope slide using a droplet of Resolve™ Microscope Immersion Oil (Cornwell Corp., Riverdale, NJ) and covered with a glass cover slip, onto which another droplet of microscope oil was added. The fluorescent images were then taken using 488 laser excitation at 60-80% power and a 505 nm long pass filter. The scanning parameters were set to define a field of view of either 23.88 microns×23.88 microns or 40.93 microns×40.93 microns.

PREPARATORY EXAMPLES

Preparatory Example 1

An acrylate mixture was prepared by first adding 75 wt % PHOTOMER 6210 with 25 wt % SR238 and 0.5% TPO to create Acrylate Resin A. 93 wt % of Acrylate Resin A was added to 7 wt % of HFPO-UA solution, resulting in a second acrylate mixture. An acrylate solution was then created by manually combining 14 wt % of the second acrylate mixture with 43 wt % PGME and 43 wt % MEK.

Preparatory Example 2

Resin D was prepared by combining and mixing PHOTOMER 6210, SR238, SR351 and TPO in weight ratios of 60/20/20/0.5. After all components were added, the mixture was blended by warming to approximately 50° C. and mixing for 12 hours on a roller mixer until the mixture appeared homogeneous.

Preparatory Example 3: 10 mM Potassium Phosphate Buffer of pH 7.0

A 0.1 M potassium phosphate buffer was first prepared by combining 38.5 g of 1 M $KH_2PO_4$ and 61.5 g of 1 M potassium phosphate dibasic trihydrate. 10 mM phosphate buffer with pH 7.0 was then prepared by mixing 10 g of the 0.1 M potassium phosphate buffer with 90 g of deionized water.

EXAMPLES

Example 1: Biofouling

Biofouling experiments were performed on the materials from Preparatory Examples 1 and 2 according to Test Method 1. The Image brightness and standard deviation from two material+dye controls and four Material+dye+DNA samples are shown in Table 4.

TABLE 4

Biofouling Test Results

| Material | Image Brightness | Standard Deviation |
| --- | --- | --- |
| HMDSO on ST505 | 1,971 | 2,326 |
| Acrylate resin A on ST505 | 5,016 | 1,245 |
| SiCxOy on COP | 5 | 73 |
| COP | −10 | 18 |
| No film | −34 | 29 |

Example 2: Fluorescence

Figure 4:
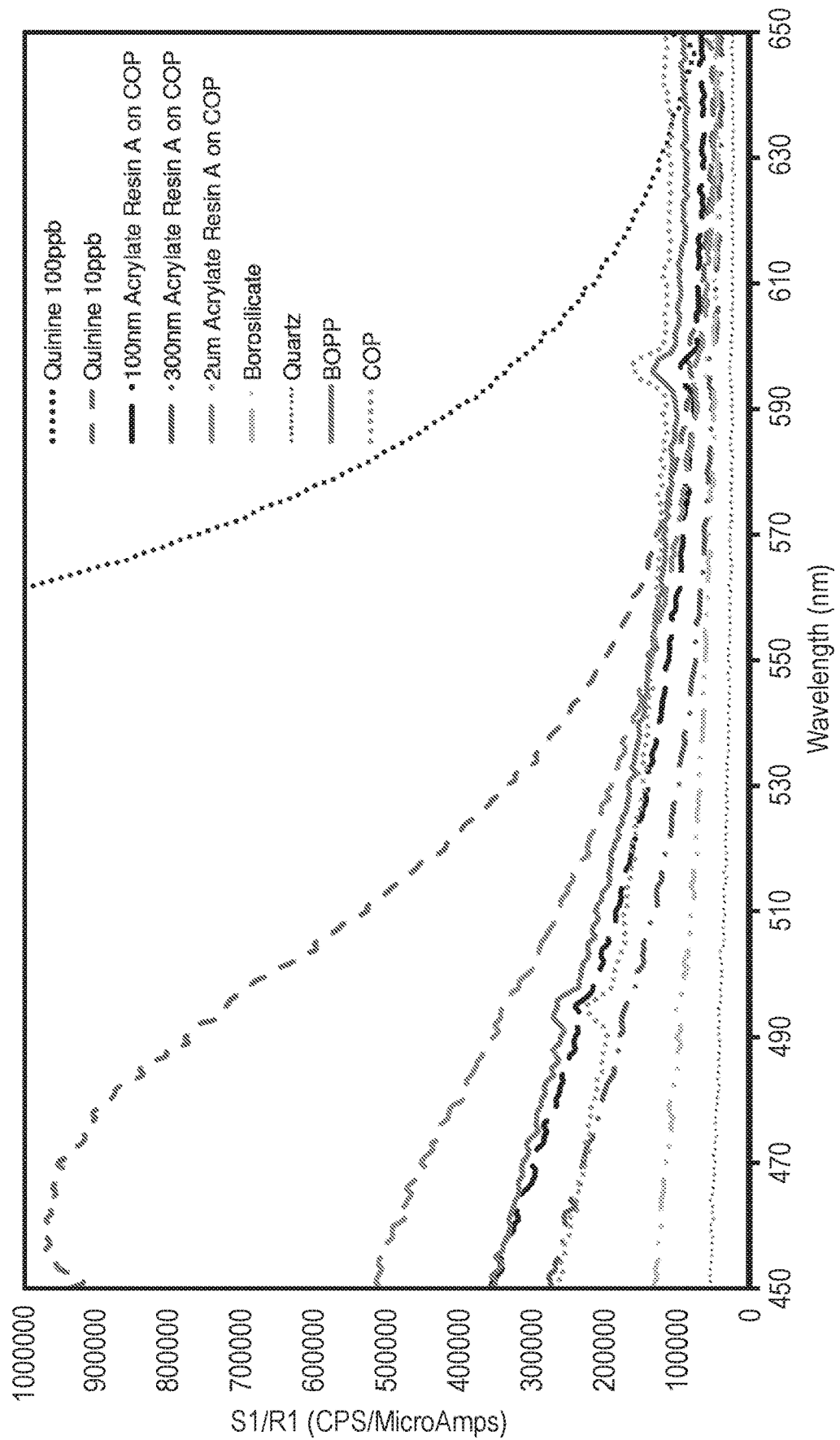
FIG. 4 is a fluorescence spectrum of film samples and standards of Example 2.

Fluorescence of 100 nm, 300 nm, and 2 um of flat coatings of Acrylate resin A on COP was measured according to Test Method 2. Fluorescence of COP and BOPP films as well as controls of quartz, borosilicate, and quinine doped samples were also measured. The intensity in CPS/Micro-Amps is shown in FIG. 4.

Example 3: Selectivity of SiCxOy/HMDSO

Figure 5:
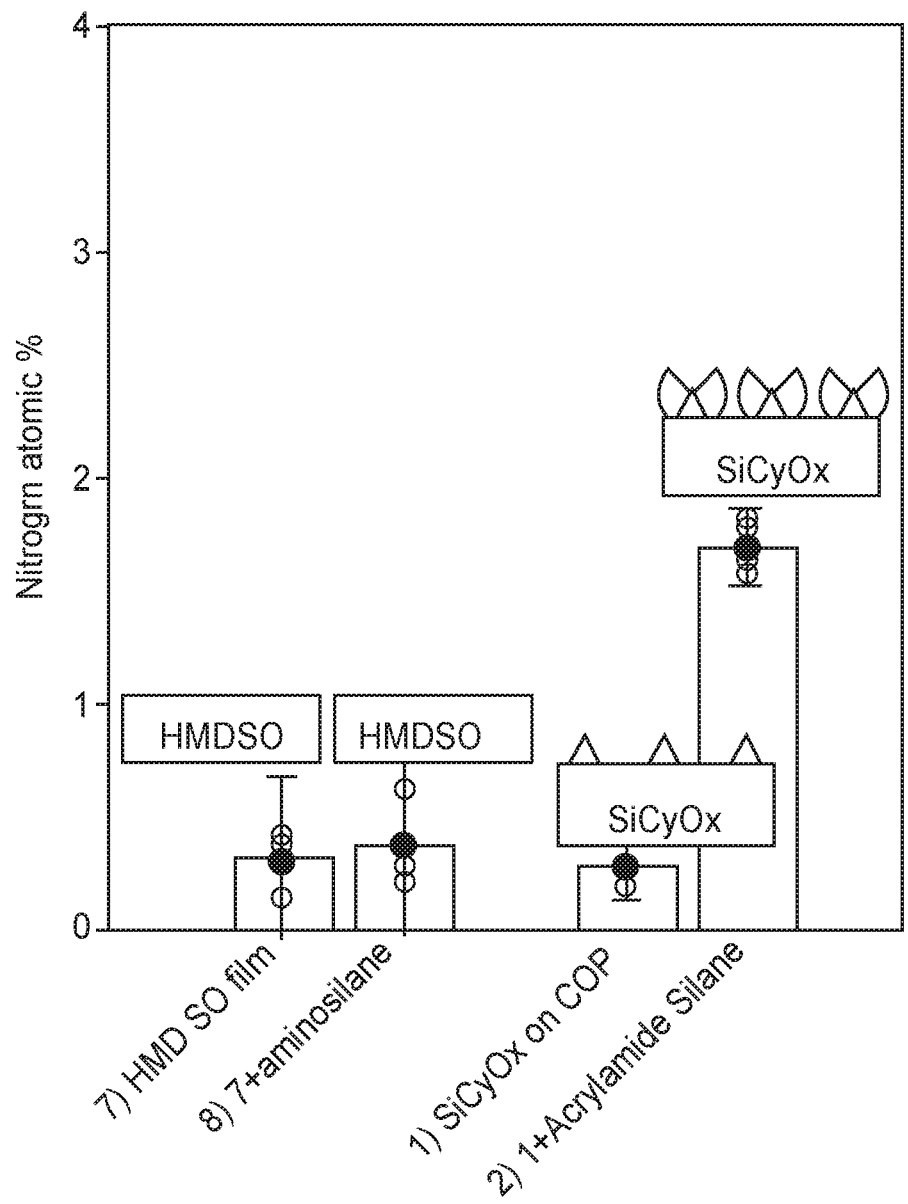
FIG. 5 is a plot of XPS data showing the selective binding of the materials of Example 3.

A silane coating solution was prepared by mixing 3-aminopropyltrimethoxysilane (1.00 g), absolute ethanol (46.3 g), acetic acid (200 mg), and water (2.5 g). Coated films were cut into 4 inch squares and immersed in silane coating solution for 45 minutes. Immediately after removing from the solution, the films were rinsed with excess ethanol using a squirt bottle, then placed in an oven held at 70° C. for 30 minutes. Films were then analyzed by XPS as described in Test Method 3 before and after silane treatment to determine the relative concentrations of nitrogen on the surfaces. Nitrogen concentration before and after exposure to aminosilane on flat HMDSO treated film and flat SiOx on COP are shown in FIG. 5.

Example 4: 400 nm Posts

Replication

A nano-structured film was prepared by die coating Resin D onto a polycarbonate support layer. The coated film was pressed against a nanostructured nickel surface attached to a steel roller controlled at 60° C. using a rubber covered roller at a speed of 15.2 meters/min. The nanostructured nickel surface consists of twelve 6 mm by 6 mm patterned areas with well features ranging in size between 75 nm and 500 nm. The features were about 200 nm tall and had side wall angles of approximately 4 degrees.

The coating thickness of Resin D on the film was sufficient to fully wet the nickel surface and form a rolling bead of resin as the coated film was pressed against the nanostructured nickel surface. The film was exposed to radiation from two Fusion UV lamp systems (obtained under the trade designation "F600" from Fusion UV Systems, Gaithersburg, MD) fitted with D bulbs both operating at 142 W/cm while in contact with the nanostructured nickel surface. After peeling the film from the nanostructured nickel surface, the nanostructured side of the support layer was exposed again to radiation from the Fusion UV lamp system fitted with a D bulb operating at 142 W/cm.

Release Treatment

An inorganic layer with a methylated surface, assembled according to methods described in U.S. Pat. No. 6,696,157 (David et al.) and 8,664,323 (Iyer et al.) and U.S. Patent Publication No. 2013/0229378 (Iyer et al.), was applied to the nano-structured film in a parallel plate capacitively coupled plasma reactor to create a nano-structured release film. The chamber has a central cylindrical powered electrode with a surface area of 1.7 m2 (18.3 ft2). After placing the nano-structured film and polymeric support layer on the powered electrode, the reactor chamber was pumped down to a base pressure of less than 1.3 Pa (2 mTorr). $O_2$ gas was flowed into the chamber at a rate of 1000 SCCM. Treatment was carried out using a plasma enhanced CVD method by coupling RF power into the reactor at a frequency of 13.56 MHz and an applied power of 2000 watts.

Treatment time was controlled by moving the nano-structured film through the reaction zone at rate of 9.1 meter/min (30 ft/min) resulting in an approximate exposure time of 10 seconds. After completing the deposition, RF power was turned off and gasses were evacuated from the reactor. Following the 1st treatment, a 2nd plasma treatment was carried out in the same reactor without returning the chamber to atmospheric pressure. HMDSO gas was flowed into the chamber at approximately 1750 SCCM to achieve a pressure of 9 mTorr. 13.56 MHz RF power was subsequently coupled into the reactor with an applied power of 1000 W.

Figure 6:
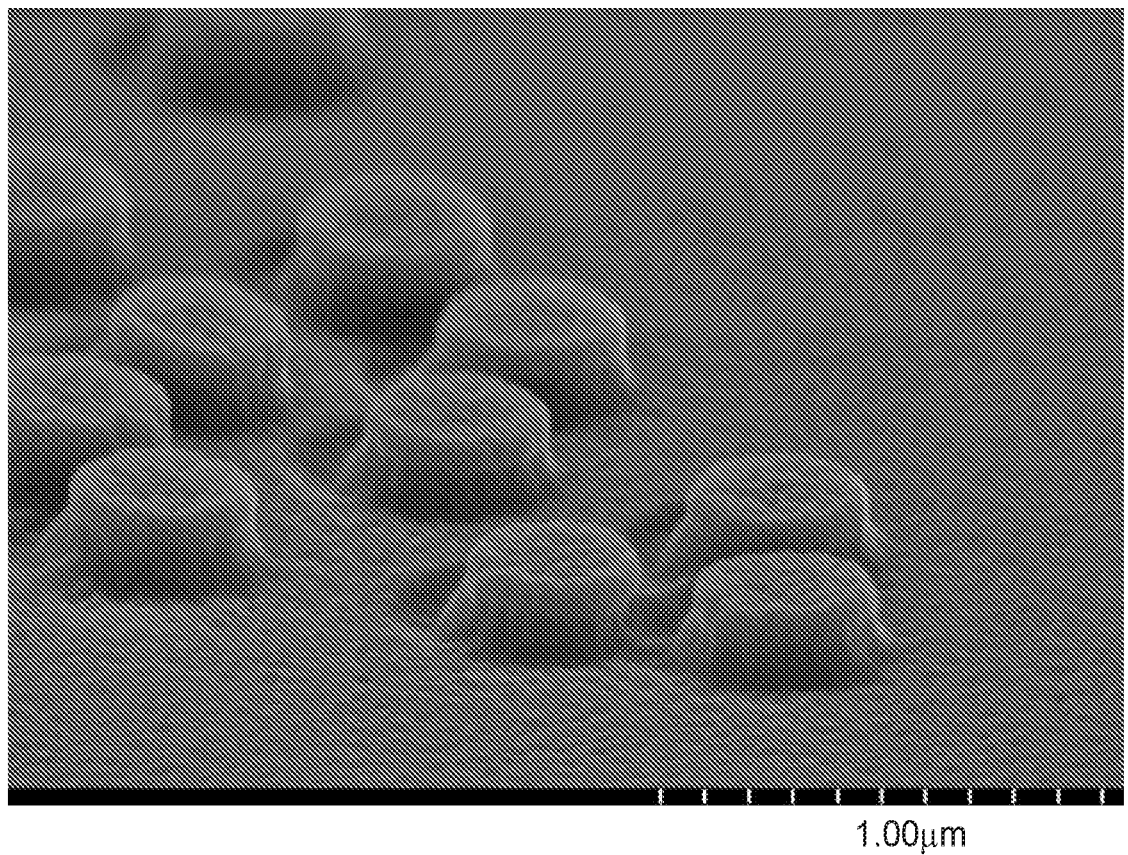
FIG. 6 is a scanning electron microscope (SEM) photograph of the 400 nm diameter nano-structured film with release treatment made according to Example 4.

The film was then carried through the reaction zone at a rate of 9.1 meter/min (30 ft/min) resulting in an approximate exposure time of 10 seconds. At the end of this treatment time, the RF power and the gas supply were stopped, and the chamber was returned to atmospheric pressure. SEM of the nano-structured release film is shown in FIG. 6.

Planarizing Layer

A solution of 5 wt % PVB 30H solution in IPA was die coated in a roll-to-roll process onto the nano-structured release film with a slot die at a rate of 0.025 m/s. The solution was coated 15.3 cm wide and pumped with a Harvard syringe pump at a rate of 2.23 sccm. The coating was dried at 65° C. for 4 minutes to create a planarized film.

Etch

Figure 7:
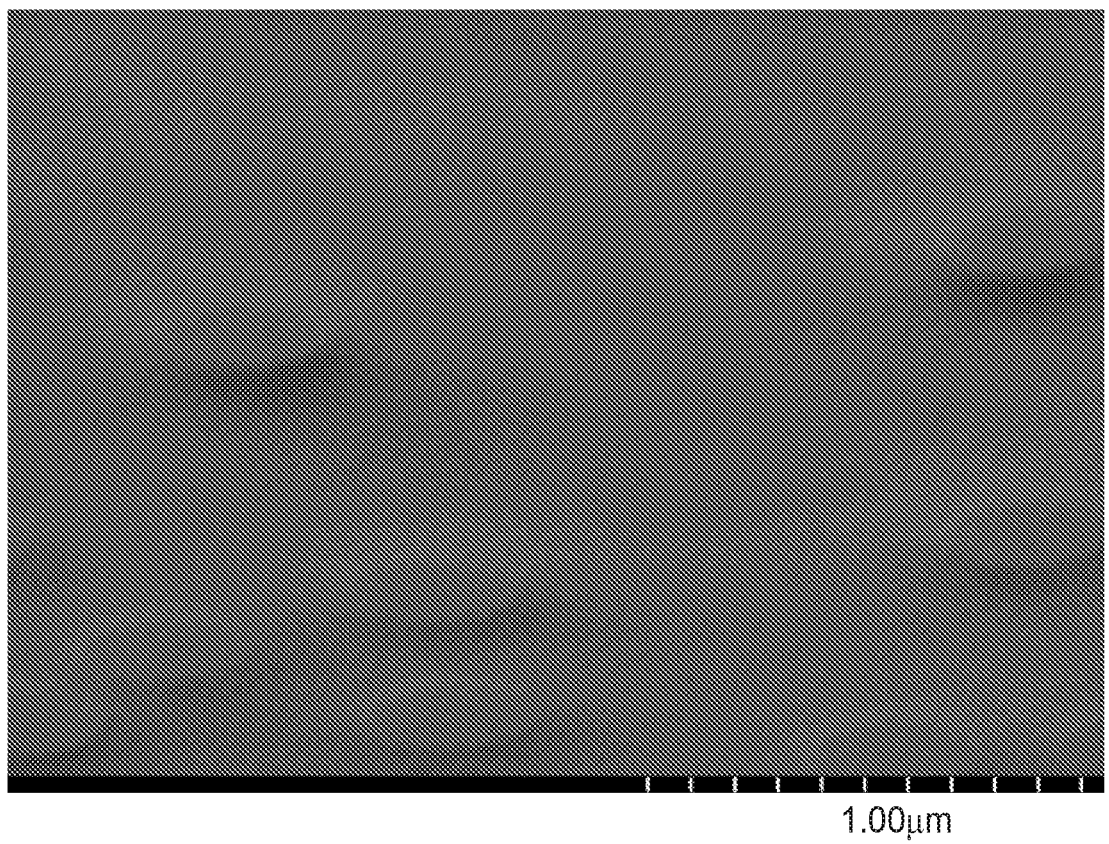
FIG. 7 is a SEM photograph of the as-etched film of Example 4.

Reactive ion etching was carried out on the planarized film in the same home-built reactor chamber used to deposit the PECVD release layer to create an etched film. After placing the coated film on the powered electrode, the reactor chamber was pumped down to a base pressure of less than 1.3 Pa (1 mTorr). $O_2$ gas was flowed into the chamber at a rate of 100 SCCM. 13.56 MHz RF power was subsequently coupled into the reactor with an applied power of 7500 W. The film was then carried through the reaction zone at a rate of 10 ft/min, to achieve an exposure time of approximately 30 sec. At the end of this treatment time, the RF power and the gas supply were stopped, and the chamber was returned to atmospheric pressure. SEM of the etched film is shown in FIG. 7.

Peel

Figure 8:
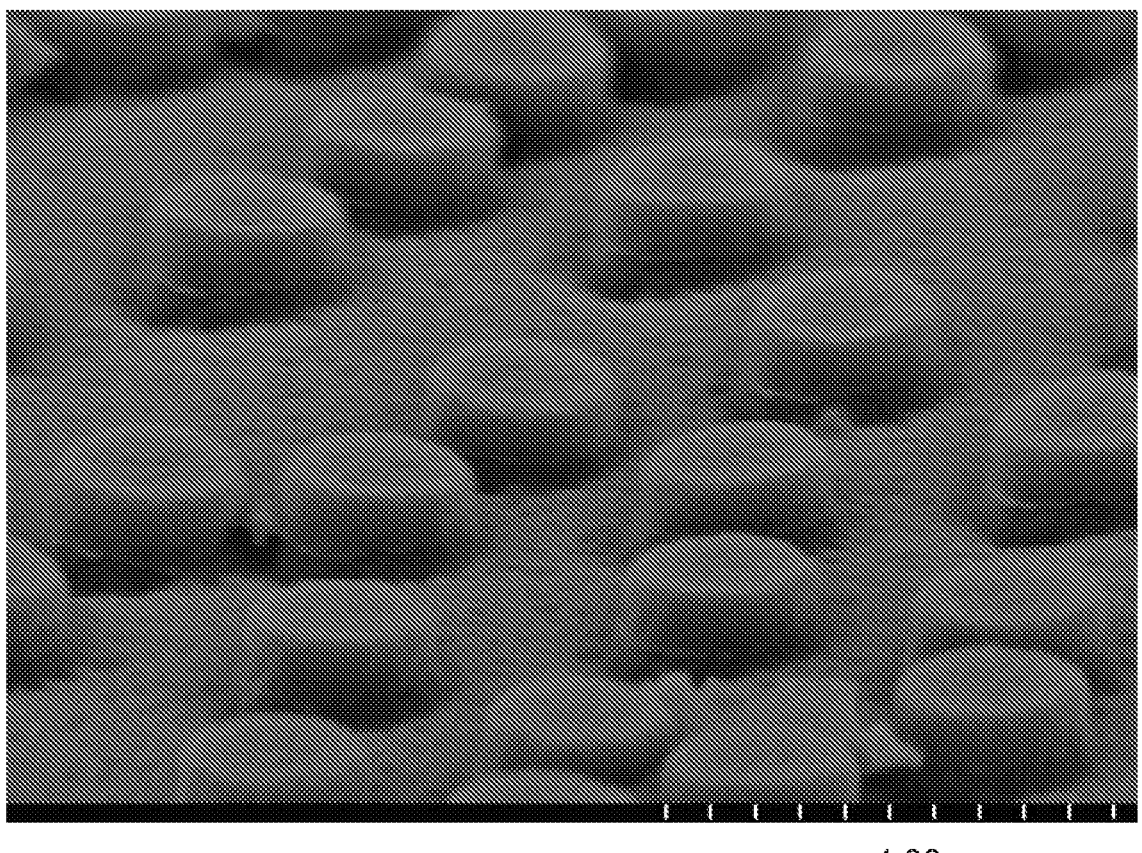
FIG. 8 is a SEM photograph of the peeled film of FIGS. 6-7.

The etched film was laminated with a corona treated film of Melinex 454 in a roll-to-roll process at 0.025 m/s (5 fpm). Acrylate resin A was syringe fed into the nip so as to keep the coating 10-12 cm wide. The nip consisted of a 90-durometer rubber roll and a steel roll set at 54° C. The nip was engaged by two Bimba air cylinders pressed by 0.27 MPa. The films remain in contact for approximately 1.5 m, where they are cured with a fusion D bulb, and subsequently peeled. By this process, the PVB remaining after etching is transferred to the Melinex 454, leaving a clean but chemically differentiated surface on the nano-structured film. SEM is shown in FIG. 8.

Analysis of Sample

Figure 9:
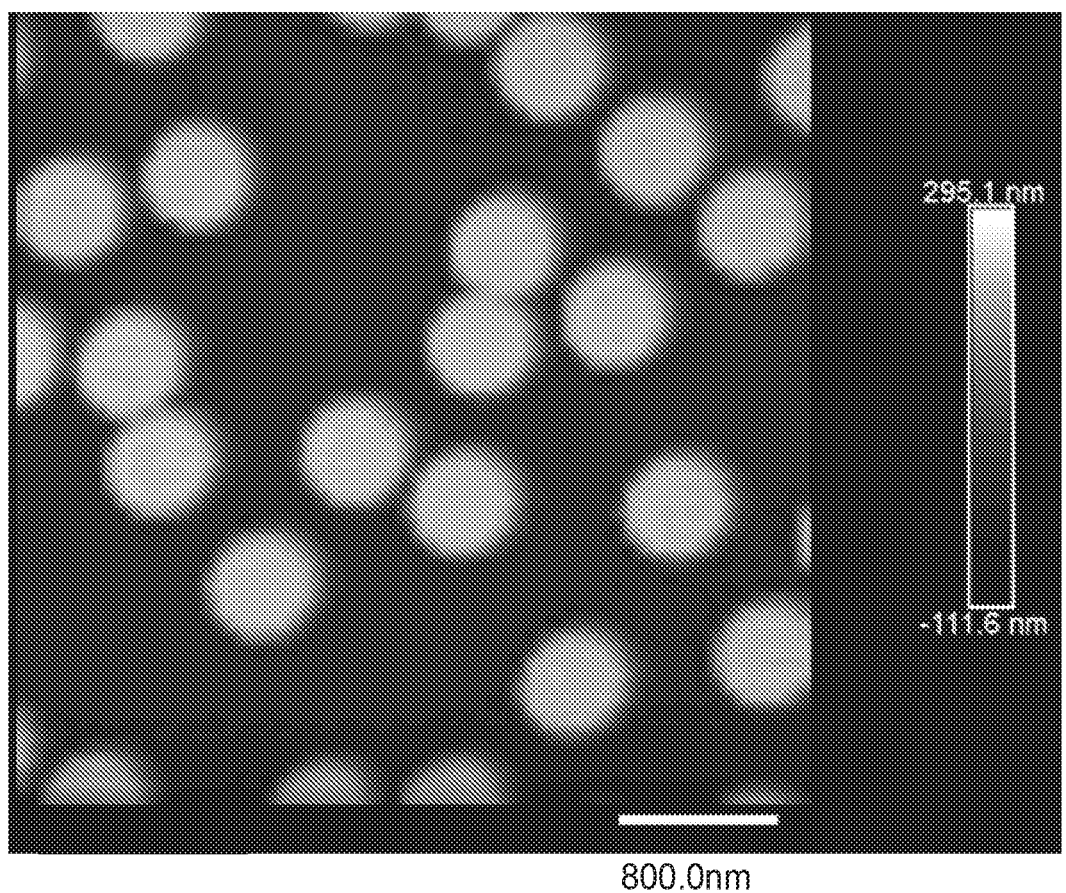
FIG. 9 is a contact force microscopy (CFM) topography image of a 4 μm×4 μm sample of the nano-structured film with release treatment made according to Example 4.
Figure 10:
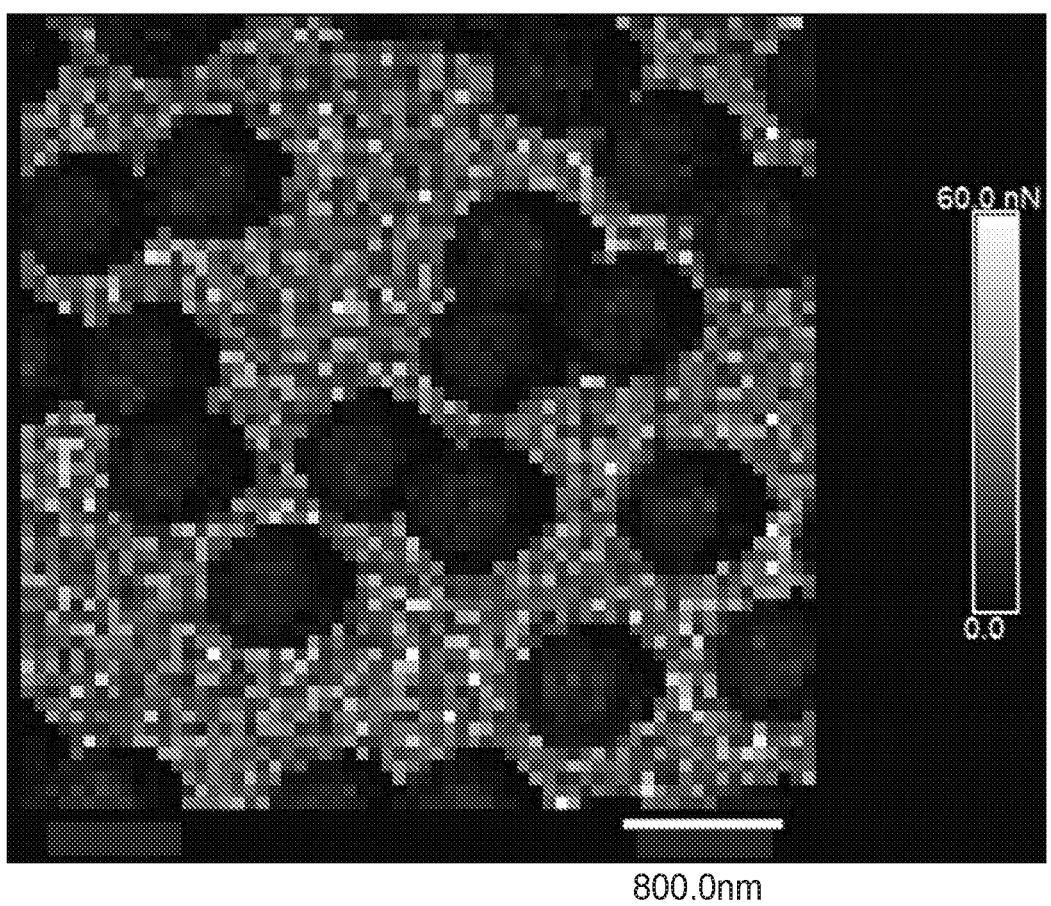
FIG. 10 is a 4 μm×4 μm force volume adhesion map obtained using a $CH_3$-terminated atomic force microscopy (AFM) probe of the film of Example 4.

A contact force microscopy (CFM) topography image of a 4 μm×4 μm sample according to Test Method 5 is shown in FIG. 9. A 4 μm×4 μm force volume adhesion map obtained using a $CH_3$-terminated AFM probe is shown in FIG. 10.

Example 5: 200 nm Diameter Posts

Replicate

A nano-structured film was made as in Example 4, except Melinex 454 film was used in place of the polycarbonate film and a nickel surface consisting of one roughly 5 cm×5 cm patch of regularly spaced 200 nm diameter wells was used.

Release Treatment

The nano-structured film was release treated as described in Example 4.

Planarizing Layer

A 4 wt % PVB 30H solution in IPA was coated as described in Example 4.

Etch

Figure 11:
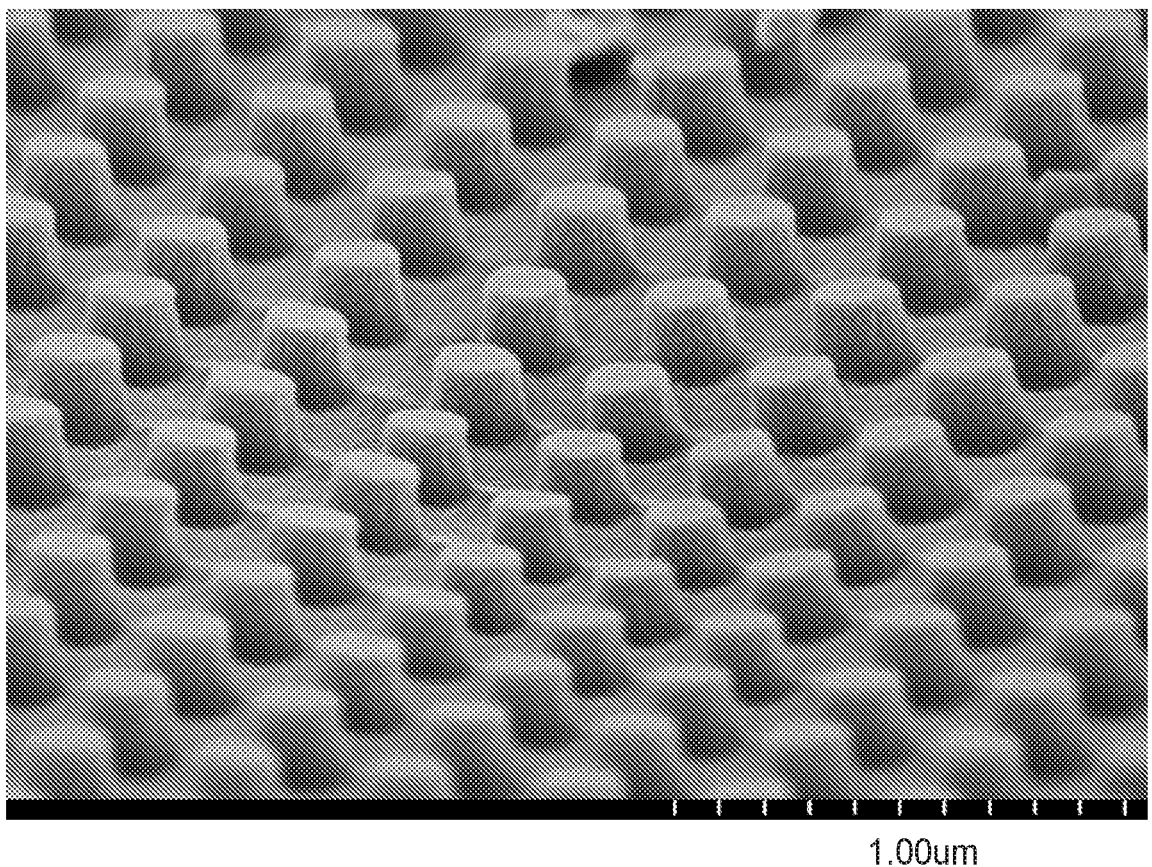
FIG. 11 is SEM photograph of the etched 200 nm diameter structured film of Example 5.

The planarized structured film was etched as described in Example 4, where the speed was changed to 10 ft/min. Partially covered posts can be seen in FIG. 11.

Figure 12:
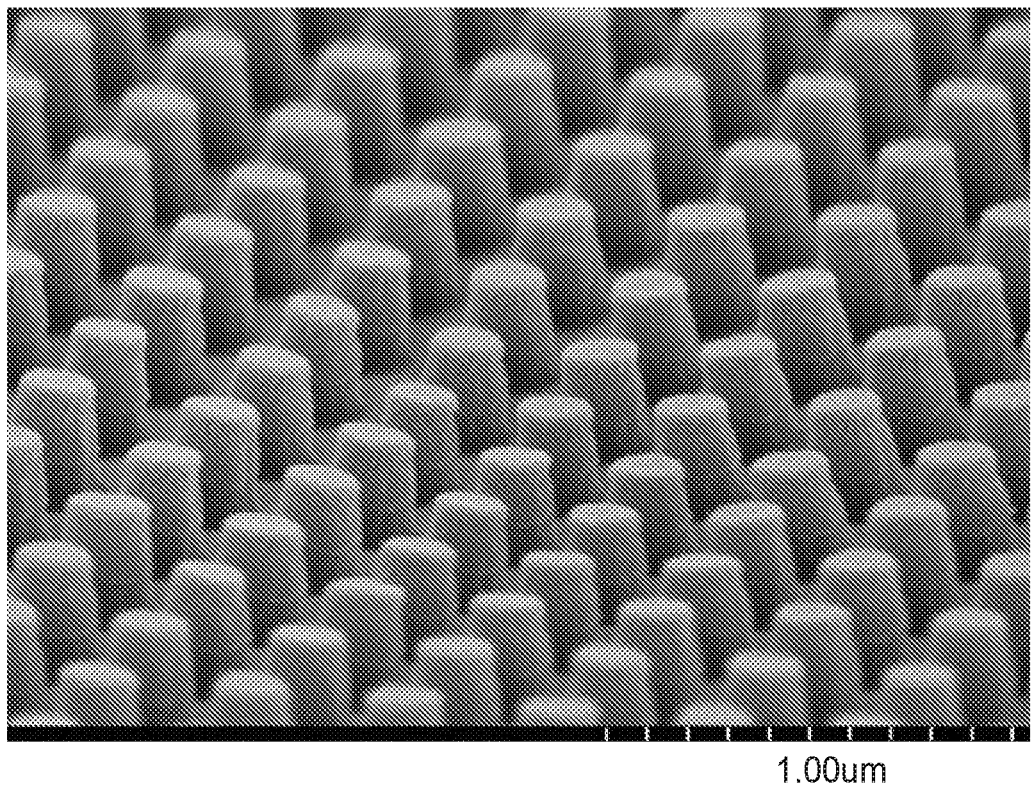
FIG. 12 is a SEM photograph of the peeled film of Example 5.

Peel 3 ml of Acrylate Resin A was placed between the etched film and a sheet of Melinex 454. The drop was spread using a hand-roller. The resin was cured by exposing to 385 nm light from a UV-LED system for 30 s. The sample was peeled apart by hand, and this transferred the PVB from the etched film to the Melinex. Different treatments of the pillars can be seen in the SEM image of the peeled structured film in FIG. 12.

Example 6: 1500 nm Posts

Replicate

A nano-structured film was made as in Example 4, except a conventional 75 um thick biaxially oriented polyethylene terephthalate (PET) film (produced in house) was used in place of the polycarbonate film. The side of the PET film that contacted the resin was primed with a thermoset acrylic polymer (Rhoplex 3208 obtained from Dow Chemical, Midland, MI). A nickel surface consisting of one roughly 15 cm×15 cm patch of regularly spaced 1500 nm diameter and 350 nm deep wells was used.

Release treatment:

The nano-structured film was release treated as described in Example 4.

Planarizing Layer

A 4 wt % PVB 30H solution in IPA was coated as described in Example 4, the pump rate was changed to 2.97 sccm.

Etch

The planarized film was etched as described in Example 4, where the speed was changed to 10 ft/min.

Peel

Figure 13:
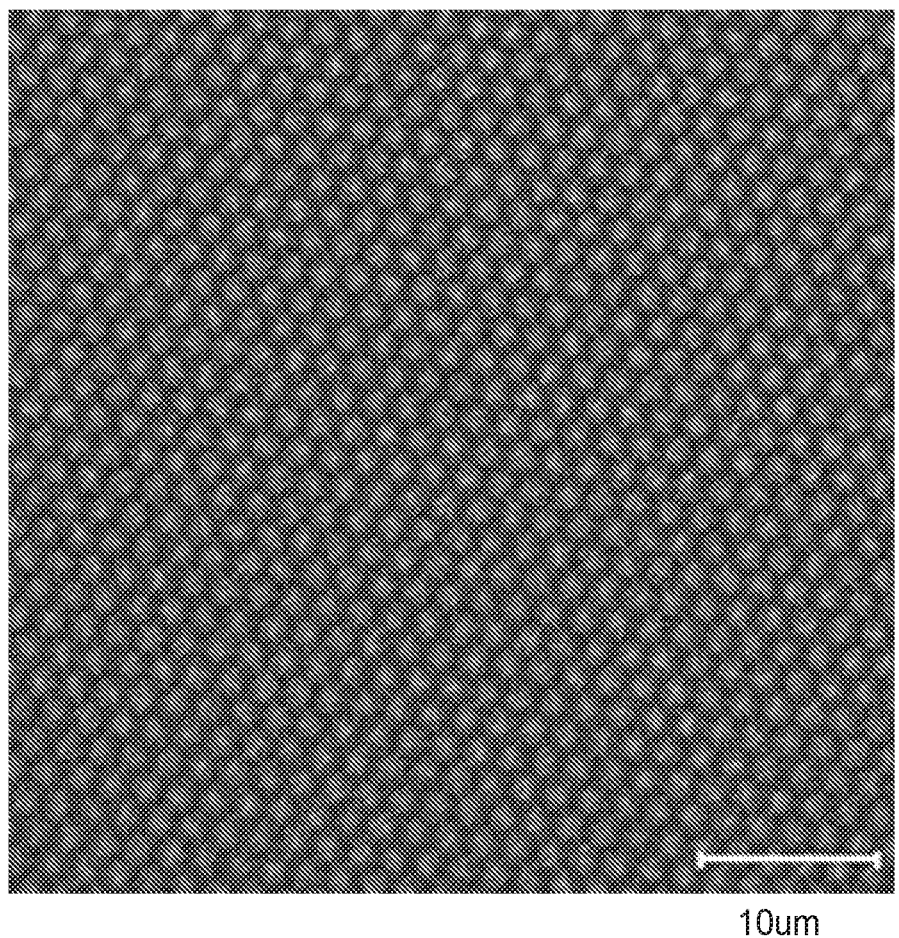
FIG. 13 is a TOF-SIMS image of the 1500 nm diameter posts of Example 6 after the peel step. The scale bar in the photograph is 10 microns (μm).

PVB was peeled from the etched film as described in Example 1, and the sample was analyzed using Test Method 4: TOF-SIMS. FIG. 13 shows the chemically differentiated post tops and valley regions.

Functionalization

The sample was silane coated as described in Example 3.

Example 7: Low-autofluorescent Nanostructured Film

Roughened COP

A COP film substrate was roughened by depositing a discontinuous silicon containing layer using PECVD while simultaneously etching the surface with a reactive species as described in U.S. Pat. No. 10,134,566. Reactive ion etching was carried out on COP film substrate in the same home-built reactor chamber used to deposit the PECVD release layer. After placing the film on the powered electrode, the reactor chamber was pumped down to a base pressure of less than 1.3 Pa (1 mTorr). HMDSO and $O_2$ gases were flowed into the chamber at rates of 18 and 750 sccm, respectively. 13.56 MHz RF power was subsequently coupled into the reactor with an applied power of 6000 W. The film was then carried through the reaction zone at a rate of 10 ft/min, to achieve an exposure time of approximately 30 sec. At the end of this treatment time, the RF power and the gas supply were stopped, and the chamber was returned to atmospheric pressure.

Low-Land Replication

First a nano-structured hole film was created by taking the release treated nano-structured film from Example 4 and coating Acrylate resin A, curing, and peeling onto a film of Melenex 454 as described in the peel step of Example 4. This nano-structured hole film was then release treated using the procedure described in Example 4.

Nano-structured posts were replicated onto the roughened COP by pre-coating Acrylate Solution C onto the release treated nano-structured hole film with a slot die at a rate of 0.051 m/s. The solution was coated 15.3 cm wide and pumped with a Harvard syringe pump at a rate of 1.8 sccm.

Figure 14:
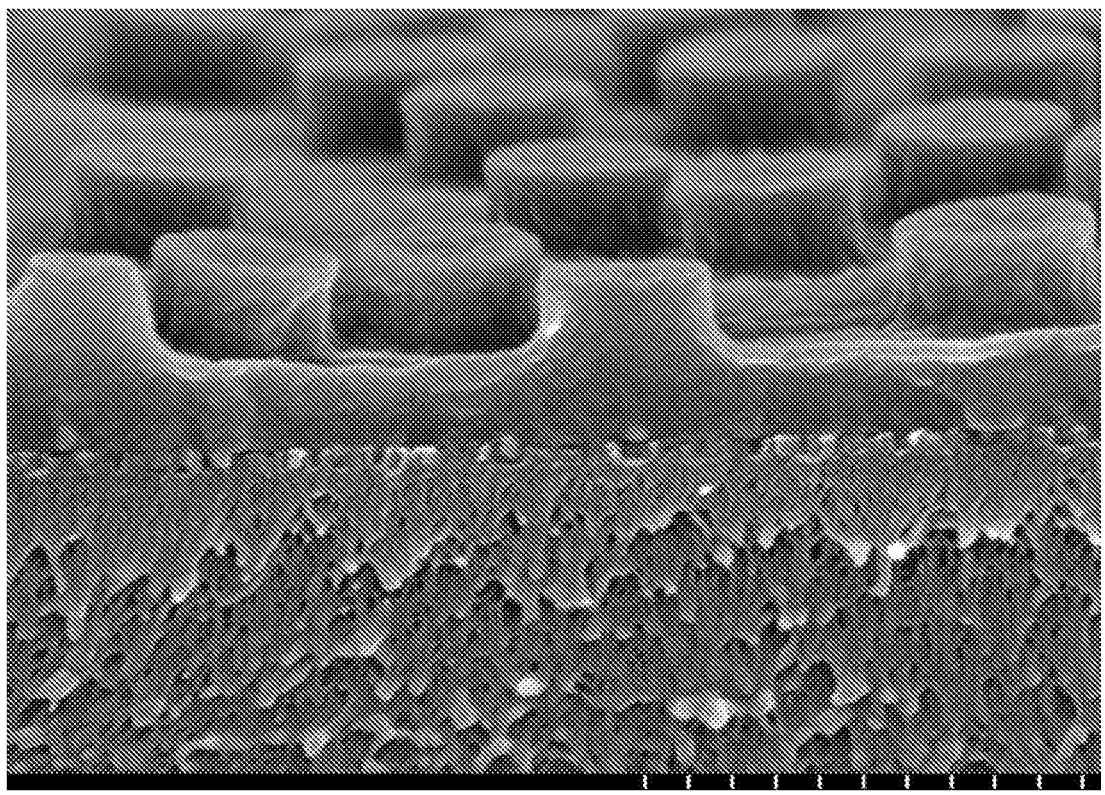
FIG. 14 is a SEM photograph of the 400 nm diameter posts on roughened COP film of Example 7.

The coating was dried at ambient conditions for 4 minutes, then laminated in a nip to the roughened COP film from the previous step. The nip consisted of a 90-durometer rubber roll and a steel roll set at 54° C. the nip was engaged by two Bimba air cylinders pressed by 0.27 MPa. The films remain in contact for approximately 1.5 m, where they are cured with a fusion D bulb, and subsequently peeled. It can be seen from the SEM photograph in FIG. 14, that this film would have a low auto-fluorescence according to the data in FIG. 4.

Release Treatment

The surface of the nano-structured film was release treated as in Example 4.

Planarizing Layer

The release treated film was overcoated with PVB, as described in example 4, except the flow rate was changed to 1.5 cc/min and the width was changed to 10.2 cm.

Remaining Steps

The remaining steps of etching, peeling and functionalization could be done as described above. The sample can optionally be laminated to one or more adhesives from Adhesive groups A, B, C, or 3M™ Optically Clear Adhesive 8171.

Example 8: Functionalization of 1500 nm Post Film with Azido Silane

Instead of a final treatment of 3-aminopropyltrimethoxysilane, the 1500 nm post patterned film of Example 6 was functionalized with a solution of 3-azidopropyltriethoxysilane by a method identical to the functionalization method defined in Example 3 but substituting 3-azidopropyltriethoxysilane for 3-aminopropyltrimethoxysilane.

Example 9: Functionalization of 1500 nm Post Film with Acrylamide Silane

Instead of a final treatment of 3-aminopropyltrimethoxysilane, the 1500 nm post patterned film of Example 6 was functionalized with a solution acrylamide silane by a method identical to the functionalization method defined in Example 3 but substituting acrylamide silane for 3-aminopropyltrimethoxysilane.

Based on XPS measurements, % nitrogen increased from 0.7% to 3.8% after acrylamide silane functionalization. The functionalized substrate was also analyzed using angular-resolved XPS, wherein the sample stage can be tilted from a 0° to a 75° orientation to selectively analyze the elemental composition of the top parts of the posts. As the XPS stage was tilted from 0° to 75°, % nitrogen increased from 3.7% to 4.6% suggesting preferential functionalization of the posts with acrylamide silane.

Example 10: Covalent Attachment of Fluorescent Dye to 1500 nm Post Film with Amino Silane The 1500 nm post film with amino silane film of Example 6 was then placed in a 12 well plate and rinsed with TE buffer pH 8.0 for three times. Approximately 500 µL of a 0.1 mg/mL Alexa Fluor™ 488 NHS ester (succinimidyl ester) in TE buffer pH 8.0 was pipeted onto the surface of the aminosilane-functionalized nanopost samples. The functionalization was set for an hour then the samples were rinsed with TE buffer pH 8.0, dried with nitrogen and imaged using a confocal microscope.

Confocal images of the fluorescent nanopost construction of Example 10 were obtained using Test Method 7 (Confocal Microscopy) as described above. The confocal micrographs show that we have achieved selectivity/contrast in the fluorescence of the tops of the posts as compared to the HMDSO-treated land areas.

Example 11: Covalent Attachment of Alkyne Oligonucleotide to 1500 nm Post Film with Azido Silane The 1500 nm post film with azido silane film of Example 8 was then functionalized with an alkyne oligonucleotide with fluorescein using Cu-catalyzed azide-alkyne cycloadditon. 10 mM potassium phosphate buffer with pH 7.0 (1.429 mL), alkyne oligonucleotide (3 nmol), N,N,N',N',N"-pentamethyldiethylenetriamine (PMDETA, 13.14 µL), copper sulfate pentahydrate ($CuSO_4 \cdot 5H_2O$, 4 w/v % solution, 7.49 µL), and sodium ascorbate (400 mg/mL, 6 µL) were charged into a 1.5 mL DNA LoBind tube one by one and vortex mixed after adding each component.

The film was placed in an aluminum weighing dish. 500 µL of the oligonucleotide solution was pipetted on the surface of the nanopost film, which was then placed in an oven set at 60° C. for 30 min. The film was taken out and rinsed with deionized $H_2O$ and dried with nitrogen. The presence of the oligonucleotides was confirmed by confocal microscopy. Confocal images of the fluorescent nanopost construction of Example 11 were obtained using Test Method 7 (Confocal Microscopy) as described above.

The confocal micrographs show that we have achieved selectivity/contrast in the fluorescence of the tops of the posts as compared to the HMDSO-treated land areas. In addition to the fluorescence, the tops of the posts also had additional rougher features which could be attributed to the deposition of the oligonucleotide.

Example 12: Growth of Amine Acrylamide Brush Polymer on Micropost Film

The solutions shown in Table 5 were added to a 25 mL vial. The 1500 nm post patterned film with acrylamide silane of Example 9 was placed in the vial so that it was fully immersed in the solution. The vial was septum capped, and nitrogen was bubbled with nitrogen through the solution for 10 minutes via a needle pierced through the septum. The needle was then removed, and the vial was placed in an oven held at 70° C. for 2 hours. The film was removed from the vial and soaked in water overnight, then air dried.

TABLE 5

Solutions for Amine Acrylamide Brush Polymer Growth on Micropost Film

| Reagent | Molar Amount (mmoles) | Concentration (% in Water) | Solution Mass (g) | Equivalents |
| --- | --- | --- | --- | --- |
| Acrylamide | 1.41 | 2 | 5 | 80 |
| N-(3-Aminopropyl)methacrylamide Hydrochloride | 0.604 | 2 | 5 | 34 |
| Ammonium Persulfate | 0.0176 | 2 | 0.20 | 1 |

Example 13: Covalent Attachment of Fluorescent Dye to Micropost Film with Amino Acrylamide Brush-Coated Tops The fluorescent Alexa Fluor™ 488 NHS ester dye was covalently attached to the micropost film with amine-containing brush polymer using the same method described for Example 10, substituting the film of Example 12 for the film of Example 6. The presence of the covalently attached fluorescent label was confirmed by confocal microscopy.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. An article, comprising:
a flexible structured film with a first major surface and a second major surface, wherein a first major surface of the flexible structured film comprises a plurality of posts separated by land areas, and wherein the posts comprise an exposed surface;
an anti-biofouling layer in the land areas, wherein the anti-biofouling layer has a methylated surface;
an inorganic layer on the exposed surfaces of the posts, wherein the inorganic layer comprises a metal, metalloid, metal oxide or a metalloid oxide; and
an analyte binding layer on the inorganic layer, wherein the analyte binding layer is chosen from a reactive silane, a functionalizable hydrogel, a functionalizable polymer, and mixtures and combinations thereof, and wherein an exposed surface of the analyte binding layer comprises at least one functional group selected to bind with a biochemical analyte.

2. The article of claim 1, wherein the inorganic layer comprises at least one of Si, Ti, or Al, or oxides thereof, and wherein the inorganic layer has a thickness of less than about 200 nm.

3. The article of claim 1, wherein the inorganic layer comprises $SiC_xO_y$, and the anti-biofouling layer comprises methyl terminated $SiC_xH_y$.

4. The article of claim 1, wherein the analyte binding layer comprises acrylamide copolymers, condensed silanes, and mixtures and combinations thereof.

5. The article of claim 1, wherein the posts have a diameter of 100 nm to 1500 nm.

6. The article of claim 1, wherein the posts have a height of greater than 0 nm and up to 1000 nm.

7. The article of claim 1, wherein the flexible structured film has low autofluorescence.

8. The article of claim 1, further comprising a polymeric support layer with a first major surface and a second major surface, wherein the first major surface of the polymeric support layer is on the second major surface of the structured film.

9. The article of claim 8, further comprising an adhesive layer on the second major surface of the polymeric support layer.

10. The article of claim 9, further comprising a support layer on the adhesive layer, wherein the support layer is chosen from a release liner and a rigid substrate.

11. A method for making a component of a diagnostic device, the method comprising:
providing a flexible structured film with a first major surface and a second major surface, wherein the first major surface of the flexible structured film comprises a patterned surface, the patterned surface comprising an arrangement of posts interspersed with land areas;
applying a release layer on the first major surface of the flexible structured film such that the release layer overlies the top surfaces of the posts and the land areas, wherein the release layer comprises a surface rich in methyl ($CH_3$) groups;
applying a planarizing layer on the release layer;
etching a portion of the planarizing layer with an oxygen-containing etch material to form a non-methylated inorganic layer on the top surfaces of the posts, wherein the inorganic layer comprises a metal, metalloid, metal oxide or a metalloid oxide;
removing the planarizing layer; and
attaching a functional silane material on the inorganic layers on the top surfaces of the posts, and polymerizing the functional silane material to form an analyte binding layer thereon, wherein the analyte binding layer is chosen from a reactive silane, a functionalizable hydrogel, a functionalizable polymer, and mixtures and combinations thereof, and wherein the analyte binding layer comprises at least one functional group reactive with a biochemical analyte.

12. The method of claim 11, where the planarizing layer is removed before attaching the functional silane.

13. The method of claim 11, where the functional layer is attached before the planarizing layer is removed.

14. The method of claim 11, wherein the analyte binding layer is attached to the inorganic layer by reacting the inorganic layer with one of an aminosilane or an acrylamide silane to form an acrylamide.

15. The method of claim 14, wherein the acrylamide is polymerized to form a poly(acrylamide).

16. The method of claim 11, wherein the inorganic layer comprises $SiC_xO_y$, and the release layer comprises methyl terminated $SiC_xH_y$.

17. The method of claim 11, wherein the analyte binding layer comprises acrylamide copolymers, condensed silanes, and mixtures and combinations thereof.

18. The method of claim 11, further comprising applying an adhesive layer on the second major surface of the polymeric support layer.

19. A diagnostic device for detection of a biochemical analyte, the diagnostic device comprising a flow cell with a patterned arrangement of fluidic channels configured to provide flow conduits for a sample fluid comprising the biochemical analyte, wherein at least some of the fluidic channels of the flow cell are lined on a surface thereof with:
a flexible structured film with a first major surface and a second major surface, wherein a first major surface of the flexible structured film comprises a plurality of posts with an exposed surface extending into the fluidic channels of the flow cell, wherein the posts are interspersed with land areas;
an anti-biofouling layer in the land areas, wherein the anti-biofouling layer comprises a methylated surface;
a non-methylated inorganic layer on the exposed surfaces of the posts, wherein the inorganic layer comprises a metal, metalloid, metal oxide, or a metalloid oxide; and
an analyte binding layer on the inorganic layer, wherein the analyte binding layer is chosen from a reactive silane, a functionalizable hydrogel, a functionalizable polymer, and mixtures and combinations thereof, and wherein an exposed surface of the analyte binding layer comprises at least one functional group selected to bind with the biochemical analyte in the sample fluid.

20. A DNA sequencing kit comprising the diagnostic device of claim 19, fluorescent reagents for DNA sequencing, and instructions.

* * * * *